(12) United States Patent
Kaminaga et al.

(10) Patent No.: US 6,986,054 B2
(45) Date of Patent: Jan. 10, 2006

(54) ATTACK-RESISTANT IMPLEMENTATION METHOD

(75) Inventors: Masahiro Kaminaga, Sakado (JP); Takashi Endo, Musashimurayama (JP); Takashi Watanabe, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 785 days.

(21) Appl. No.: 10/021,042

(22) Filed: Dec. 19, 2001

(65) Prior Publication Data

US 2002/0178371 A1 Nov. 28, 2002

(30) Foreign Application Priority Data

Mar. 30, 2001 (JP) ............................. 2001-097964

(51) Int. Cl.
G06F 11/30 (2006.01)
G06F 12/14 (2006.01)
H04L 9/32 (2006.01)

(52) U.S. Cl. ...................... 713/193; 713/194; 713/171; 380/28; 380/30; 380/277; 380/279

(58) Field of Classification Search ................ 713/193, 713/194, 171; 380/28, 30, 44, 277, 279
See application file for complete search history.

(56) References Cited

U.S. PATENT DOCUMENTS 5,872,846 A * 2/1999 Ichikawa ..................... 380/282
6,081,597 A * 6/2000 Hoffstein et al. ............. 380/28
6,408,075 B1 * 6/2002 Ohki et al. ................... 380/28

FOREIGN PATENT DOCUMENTS

EP 1 006 492 A1 11/1999
EP 981223 A2 * 2/2000

OTHER PUBLICATIONS

"Physical and Electrical Properties," The Smart Card Handbook, pp. 40-41 and pp. 262-263.
European Search Report dated Apr. 17, 2003.

* cited by examiner

Primary Examiner—Gilberto Barron, Jr.
Assistant Examiner—Samson Lemma
(74) Attorney, Agent, or Firm—Reed Smith LLP; Stanley P. Fisher, Esq.; Juan Carlos A. Marquez, Esq.

(57) ABSTRACT

The present invention makes it difficult for unauthorized parties to estimate processing and a secret key based upon the waveforms of power consumption of an IC card chip by changing a processing order in the IC card chip so that it is not estimated by the attackers. In an information processing apparatus comprising storing means having a program storing part for storing programs and a data storing part for storing data, an operation processing unit, means for inputting data to be operated on in the operation processing unit, and means for outputting operation processing results on the data by the operation processing unit, an arithmetic operation method is provided which comprises the steps of: for two integers K1 and K2, when finding a value F(K, A) of a function F satisfying F(K1+K2, A)=F(K1, A)○F(K2, A) (○ denotes an arithmetic operation in a commutative semi-group S. K designates an integer and A designates an element of S), decomposing the K to the sum of m integers K[0]+K[1]+ . . . K[m-1]; using T(0), T(1), . . . T(m-1) resulting from rearranging a string of the m integers 0, 1, . . . m-1 by permutation T (the result corresponds one for one to the integer string 0, 1, . . . m-1); and operating on terms F(K[T(0)], A) to F(K[T(m-1)], A) on the right side of $$F(K, A)=F(K[T(0)], A) \bigcirc F(K[T(1)], A) \bigcirc \ldots F(K[T(m-1)], A) \ldots \quad \text{(expression 1)}$$

in the order of F(K[T(0)], A), F(K[T(1)], A), . . . F(K[T(m-1)], A) to find F(K, A).

19 Claims, 19 Drawing Sheets

FIG. 16

| Address | Value | Label |
|---|---|---|
| ADDR | 127 | V(0) |
| ADDR+2*1 | 21 | V(1) |
| ADDR+2*2 | 170 | V(2) |
| ADDR+2*3 | 509 | V(3) |
| ADDR+2*4 | 342 | V(4) |
| ⋮ | ⋮ | ⋮ |
| ADDR+2*509 | 263 | V(509) |
| ADDR+2*510 | 428 | V(510) |
| ADDR+2*511 | 79 | V(511) |

FIG. 20

| Address | Value | Label |
|---|---|---|
| ADDR | 27 | V(0) |
| ADDR+2*1 | 21 | V(1) |
| ADDR+2*2 | 70 | V(2) |
| ADDR+2*3 | 59 | V(3) |
| ADDR+2*4 | 42 | V(4) |
| ⋮ | ⋮ | ⋮ |
| ADDR+2*77 | 63 | V(77) |
| ADDR+2*78 | 69 | V(78) |
| ADDR+2*79 | 3 | V(79) |

ATTACK-RESISTANT IMPLEMENTATION METHOD

BACKGROUND OF THE INVENTION

1. Field of the Invention

The present invention relates to an attack-resistant implementation method and, more particularly to an attack-resistant information processing apparatus and the like of an IC card or the like providing high security.

2. Description of the Prior Art

An IC card is an apparatus that stores personal information which is inhibited from being rewritten without authorization, encrypts data with secret keys (secret information), and decrypts cryptograms. The IC card itself has no power but it is supplied with power to become ready for operation when inserted in an IC card reader/writer. Upon becoming ready for operation, the IC card receives a command sent from the reader/writer and performs data transfer and other processing according to the command. General descriptions of IC card are provided in Jun-ichi Mizusawa, "IC Card," published by Ohm-sha, edited by the Institute of Electronics, Information and Communication Engineers—IEICE.

The IC card comprises an IC card chip 102 mounted on a card 101, as shown in FIG. 1. As shown in the drawing, generally, the IC card has a supply voltage pin Vcc, a ground pin GND, a reset pin RST, an input-output pin I/O, and a clock pin CLK, which are positioned according to the ISO7816 specifications. Through these pins, the IC card is supplied with power from the reader/writer and performs data communications with the reader/writer (see W. Rankl and Effing, "SMARTCARD HANDBOOK," John Wiley: Sons, 1997, pp. 41).

The configuration of the IC card chip is basically the same as that of normal microcomputers. The IC card chip, as shown in FIG. 2, comprises a central processing unit (CPU) 201, a memory device 204, an I/O port 207, and a coprocessor 202 (optional). The CPU 201 performs logical operations and arithmetic operations, and the memory device 204 stores programs and data. The I/O port performs communications with the reader/writer. The coprocessor fast performs encryption processing or arithmetic operations necessary for encryption processing, e.g., special operation devices for performing residue operations of RAS encryption and encryption devices that perform round processing of DES encryption. Many processors for IC cards have no coprocessor. A data bus 203 is a bus for connecting devices.

The memory device 204 comprises ROM (Read Only Memory), RAM (Random Access Memory), and EEPROM (Electrical Erasable Programmable Read Only Memory). ROM is a memory whose contents cannot be modified and which primarily stores programs. RAM is a memory whose contents can be freely modified, but its stored contents are lost when power supply is stopped. If the IC card is removed from the reader/writer, since power supply is stopped, RAM contents are not retained. EEPROM retains its contents even if power supply is stopped. It is used to store data to be modified and retained even if the IC card is removed from the reader/writer. For example, the number of prepaid operations by a prepaid card is retained in EEPROM since it is modified each time it is used, and the data must be retained even if the reader/writer is removed.

Since the IC card seals programs and important information in the IC card chip, it is used to store and encrypt important information in the card. Conventionally, the difficulty of decrypting IC cards has been thought to be the same as that of decrypting encryption algorithms. However, the observation and analysis of the power consumption of the IC card during performing encryption processing, the contents of the encryption processing and secret keys could be more easily estimated or decrypted than decrypting the encryption algorithms. The power consumption is measured by measuring power supplied from the reader/writer. The details of the method for an authorized decryption are given in John Wiley; sons company W. Rankl; W. Effing, "Smart Card Handbook", 8.5.1.1 "Passive protect mechanism", page 263, in which such risks are described.

The CMOS constituting the IC card chip consumes power when an output state changes from 1 to 0 or from 0 to 1. Particularly in the data bus 203, large power flows when the value of a bus changes from 1 to 0 or from 0 to 1 due to the power of a bus driver and the capacitance of wirings and transistors connected to the wirings. For this reason, the observation of power consumption indicates which portion in the IC card chip is operating.

FIG. 3 shows a waveform of power consumption in one cycle of the IC card chip. Depending on the data processed, power waveforms differ as shown in 301 and 302. Such a difference occurs depending on data flowing through the bus 203 and the data processed in the central processing unit 201.

The coprocessor 202 can perform residue operations of, e.g., 512 bits in parallel with the CPU. Therefore, the power consumption waveforms different from CPU power consumption waveforms are observed for a long time. By observing the characteristic waveforms, the number of operations of the coprocessor is easily measured. If the number of operations of the coprocessor has a relationship with secret keys, the secret keys could be estimated from the number of operations of the coprocessor.

If operation contents of the coprocessor have peculiarities depending on secret keys, the peculiarities reflect the power consumption, and the secret keys could be estimated.

The same is also true for the CPU. Since the bit values of encryption keys are definite, by changing data to be processed and observing power consumption, influence of the bit values of secret keys could be observed. Secret keys could be estimated by statistically processing these waveforms of power consumption.

SUMMARY OF THE INVENTION

An object of the present invention is to scramble a correlation between data processing in an IC card chip and, the relevant hardware operation phenomena, such as the power consumption, which would make it difficult to estimate the processing in the IC card chip and the secret keys by observing waveforms of power consumption. The aim of the present invention is to change a processing order in the IC card chip against attacker's probing to so as to make it difficult to estimate processing in the IC card chip and secret keys by observing the waveforms of power consumption.

An attack-resistant apparatus comprising an IC card chip has a program storing part for storing a program, a storage unit having a data storing part for storing data, and a central processing unit (CPU) for performing predetermined data processing according to the program, wherein the program can be regarded as an information processing apparatus comprising one or more data processing means each consisting of processing instructions for CPU execution.

The present invention scrambles the correlation between data processed and the power consumption of an IC card chip by changing one arithmetic operation order to another one. Although different processing orders generally yield different processing results, application of the present invention assumes that an arithmetic operation F(K,A) satisfies F(K1+K2,A)=F(K1,A)○F(K2,A) for given K1 and K2. By using this property, when K is split to the sum of m integers K[0]+K[1]+ . . . +K[m−1], the following expression is satisfied.

$$F(K,A)=F(K[0],A)○F(K[1],A)○ \ldots ○F(K[m-1], A)$$

Fs satisfying this property include F(K,A)=A^k mod N (in this case, arithmetic operation A○B is equivalent to A*B mod N) and F(k,A)=kA (A is a point on an elliptic curve, an arithmetic operation ○ denotes an addition operation on points on the elliptic curve, and kA designates k additions of A).

The present invention takes advantage of this property; i.e., elements F(K[0],A), F(K[1],A), . . . , F(K[m−1],A) are computed. By using these elements, F(K,A)=F(K[0],A)○F(K[1],A)○ . . . ○F(K[m−1],A) is not computed in order, but each time computation of the F(K,A) is executed, the F(K,A) is computed in a changed order of F(K[T(0)],A)○F(K[T(1)],A)○ . . . ○F(K[T(m−1)],A), where T(0), T(1), . . . , T(m−1) result in 0, 1, 2, . . . , m−1 being rearranged by permutation T.

This processing would make it difficult to locate original data from only partial information appearing in observed power waveforms. Statistical processing would average random waveforms and eliminate characteristics of the waveforms, which provides a higher degree of effectiveness. If the changed order of processing is made on an unpredicted information source, the disturbance effect would be further increased.

The present invention is particularly applicable to the concealment of information in processing, such as modular multiplication operations and modular exponentiation operations in RAS encryption, and multiplication and division on a field of definition and scalar multiplication on points on elliptic curves in elliptic curve encryption.

Other and further objects, features and advantages of the invention will appear more fully from the following description.

BRIEF DESCRIPTION OF THE DRAWINGS

The preferred embodiments of the present invention are illustrated in the accompanying drawings in which:

FIG. 16 shows a permutation table related to the RSA encryption processing of the present invention.

FIG. 20 shows a permutation table of the first embodiment of elliptic encryption processing of the invention;

DETAILED DESCRIPTION OF THE PREFERRED EMBODIMENTS

Figure 1:
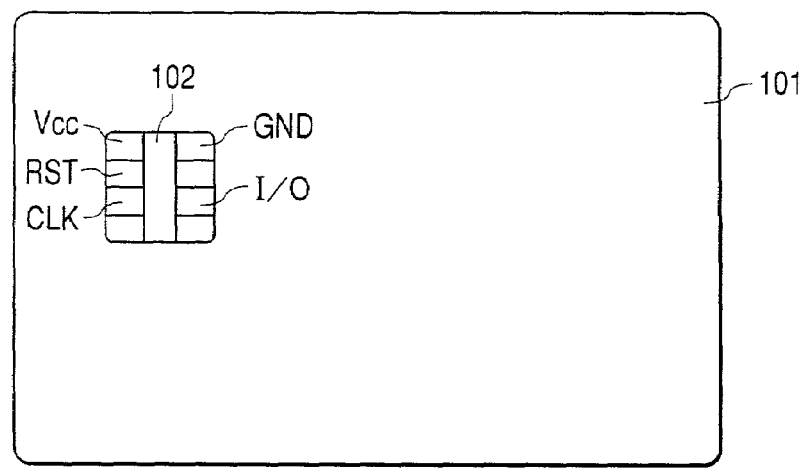
FIG. 1 is a drawing showing a top view of a common IC card.
Figure 2:
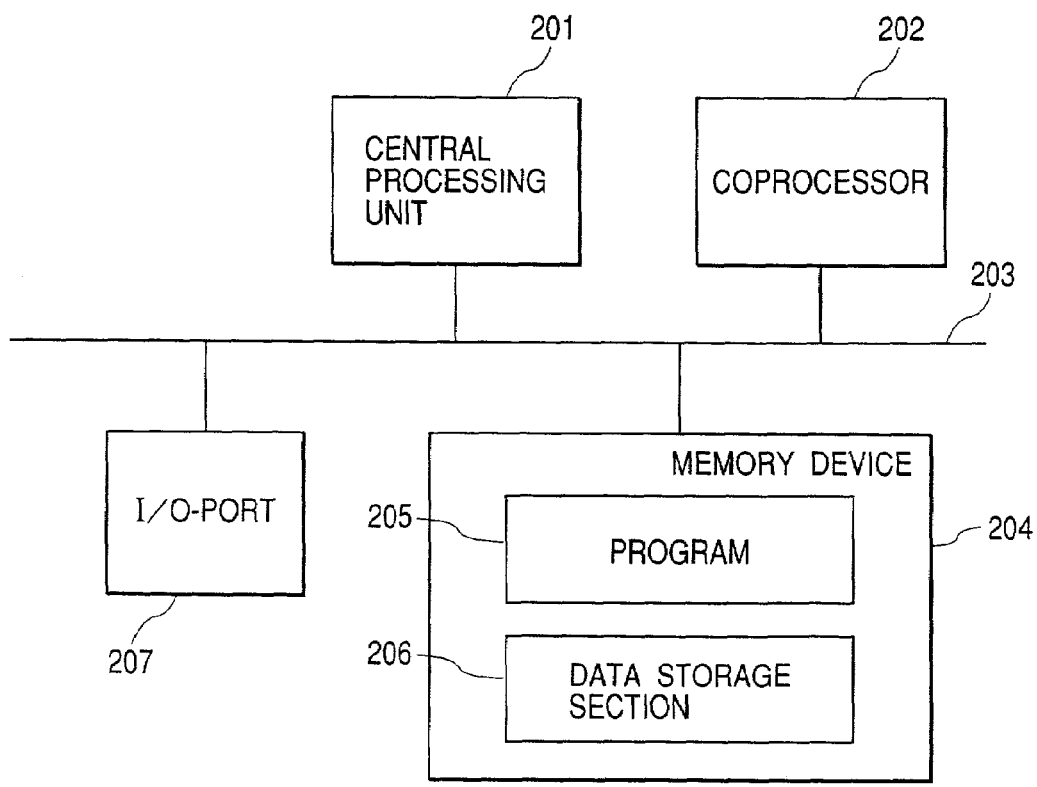
FIG. 2 is a drawing showing the configuration of a common microcomputer.
Figure 3:
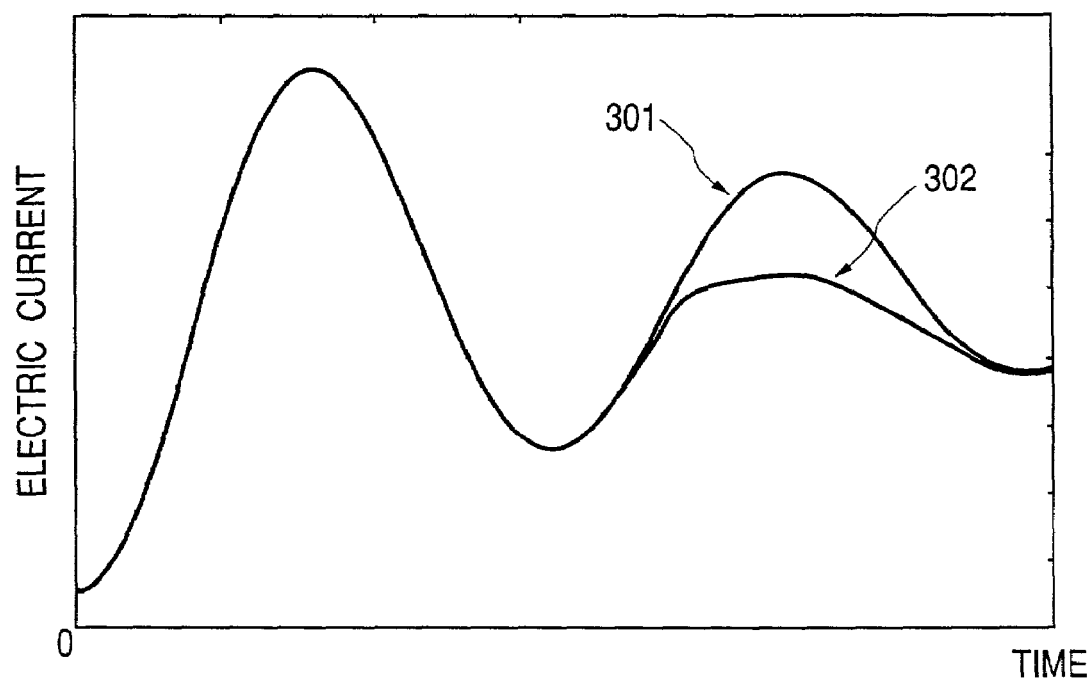
FIG. 3 is a drawing showing an example of power consumption waveforms of one cycle in an IC card chip.

This embodiment describes typical examples of public key encryption (asymmetric encryption), such as RSA encryption and elliptic curve encryption. This embodiment can also apply to other encryption methods. The RSA encryption is described in detail in Eiji Okamoto, "Anngou Riron Nyuumon", Kyouritsu-shuppan, and A. J. Menezes, P. C. van Oorschot, S. A. Vanstone, "Handbook of Applied Cryptography", CRC-Press, and others. The elliptic curve encryption is described in detail in N. Koblitz, "A Course in Number Theory and Cryptography", second edition, Graduate Texts in Mathematics 114, Springer-Verlag, 1987, which was written by one of inventors. Arithmetic operations on elliptic curves are described in detail in J. H. Silverman and J. Tate, "Rational Points on Elliptic Curve", Springer-Verlag, 1992, and linear algebra systems such as group, ring, and field in K. Matsuzaka, "Introduction to Algebra", Iwanami syoten.

Generally, in public key encryption (asymmetric key encryption), encryption is formed based on the fact (security based on large computation time) that retrieving secret key information from public key is extremely unrealistic in terms of computation time although the secret key information is contained in public key. Typical problems having the security based on large computation time include the prime factorization and the discrete logarithm problem on group. The RSA encryption employs the former, and the elliptic curve encryption employs the latter in the form of application to groups on an elliptic curve.

The RSA encryption is described briefly. In the RSA encryption, a product N=pq, where p an q are large prime numbers of, e.g, 512 bits, and a number e (in IC cards, 3 or 65,537 is often used) prime to N are employed and registered directory as public key in a public key directory. At this time, to an owner A of the public key, a sender B encrypts data (plaintext) M expressed by a number equal to or greater than 1 and equal to or less than N−1 by the following expression and sends the encrypted data.

y=M^e mod N, where M^e is a symbol denoting the e-th power of M.

Upon receiving the cryptogram C, A computes the following expression using secret key x satisfying xe mod (p−1)(q−1)=1.

S=y^x mod N, where (p−1)(q−1) is a value phi(N) of an Euler function of N.

This is equal to the number of natural numbers mutually prime to N. According to the Euler's theorem, y^((p−1)(q−1)) mod N=1 is satisfied, while xe can be written as 1+k(p−1)(q−1) (k is an integer). Therefore, the following expression is satisfied.

$$y^x \bmod N = M^{(xe)} \bmod N$$
$$= M^{(1+k(p-1)(q-1))} \bmod N$$
$$= M * M^{(k(p-1)(q-1))} \bmod N$$
$$= M$$

Hence, by computing y^x mod N, A decrypts the plaintext M of the sender B. In this case, to compute the secret key x, instead of N itself, prime factors p and q of N are used. This is extremely important. Presently, a method of computing x without splitting N to prime numbers is not known. Since factorizing the product of large prime numbers requires an unrealistic amount of time, the secret key of A would be safe even if N is publicized.

The computation of the RSA encryption can be defined on a semigroup in which, for all residues Z(N) modulo an integer N, the arithmetic operation of product modulo N is introduced. Generally, when N is not a prime number, it is to be noted that Z(N) does not form a group because it has no multiplicative inverse.

Figure 4:
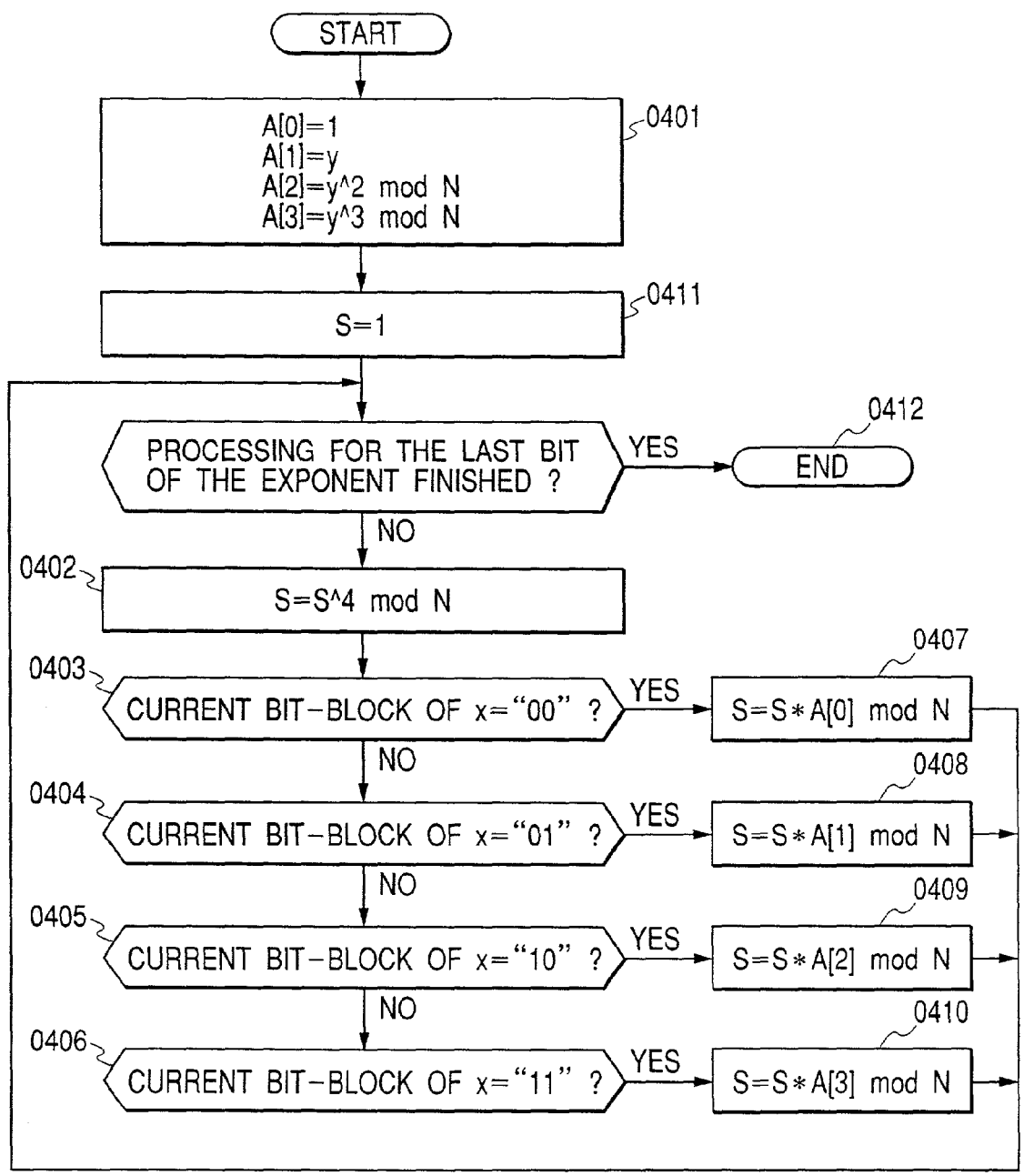
FIG. 4 is a flowchart showing the modular exponentiation operation using the addition chain method.

Arithmetic operations used in encryption/description processing of the RSA encryption, called modular exponentiation operation, and they are usually implemented on a computer according to an algorithm shown in FIG. 4. This implementation method is referred to as an addition chain method. As shown in the drawing, y^x mod N is computed in a manner that splits bits of secret key x every 2 bits from higher bit positions of x, which are respectively associated with A[0]=1, A[1]=y, A[2]=y^2 mod N, and A[3]=y^3 mod N, depending on whether they are 00, 01, 10, and 11, before performing modular multiplication. For simplicity, the bits are split every 2 bits. Actually, 1, 3, or 4 bits may be used as a split unit for computation with the same concept.

This processing is shown in FIG. 4. A table 0401 for 2-bit processing is provided. S is initialized to 1 (0411), and the control goes to a fourth-power processing 0402. Although the fourth-power processing 0402 is performed independently of bits of x, in the next modular multiplication, according to the value of bits (every 2 bits) of x, conditional branch is made (0403, 0404, 0405, and 0406) to respectively perform modular multiplication 0407, 0408, 0409, and 0410. In this case, differences are represented in values A[0], A[1], A[2], and A[3] of the table 0401. Generally, modular multiplication are heavily processed (therefore, in many IC cards, a coprocessor is dedicated to modular multiplication processing), while a great deal of power is generated. It may be found which of A[0], A[1], A[2], and A[3] is being processed particularly during multi-digit computation. For simplicity, in 16-bit computation, for example, when y=58981 and N=59989 (=239*251), if A[0], A[1], A[2], and A[3] are represented in binary, the following bit strings A[0]=0000000000000001
A[1]=0011001010011000
A[2]=1011001011001110
A[3]=1001111110010101 are produced. Different power waveforms are generated correspondingly to differences of the bit strings. If waveform patterns can be classified into four types based on the differences, a bit pattern of the secret key can be found by trying different combinations of patterns (4!=24 possible values) of the four permutations. The same is also true for an increased number of bits of modulus n.

This attack method exhibits a remarkable effect particularly when the number of bits of N increases. For example, when N is 2048 bits, although it is virtually impossible to perform factorization, the power consumption of a chip can be checked using an oscilloscope to determine the value of x (about 2000 bits). After blocks of a waveform of about 2000 bits (about 1000 blocks if the waveform is split every 2 bits) are classified into four types, modular exponentiation operation is performed using a different computer for each of the four types. Then comparison is made with results outputted from the chip to find a match. This requires no more than 24 executions.

Figure 5:
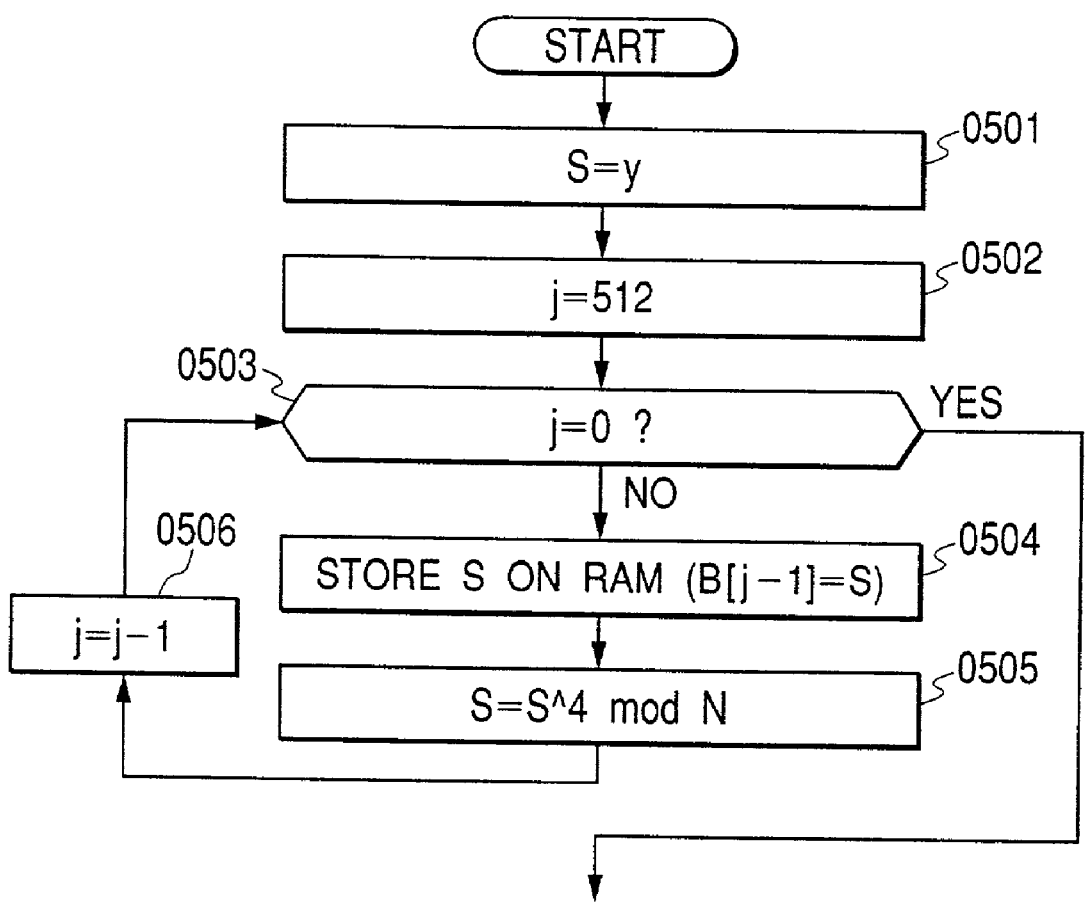
FIGS. 5 is a flowchart showing modular exponentiation operation using the addition chain method.
Figure 6:
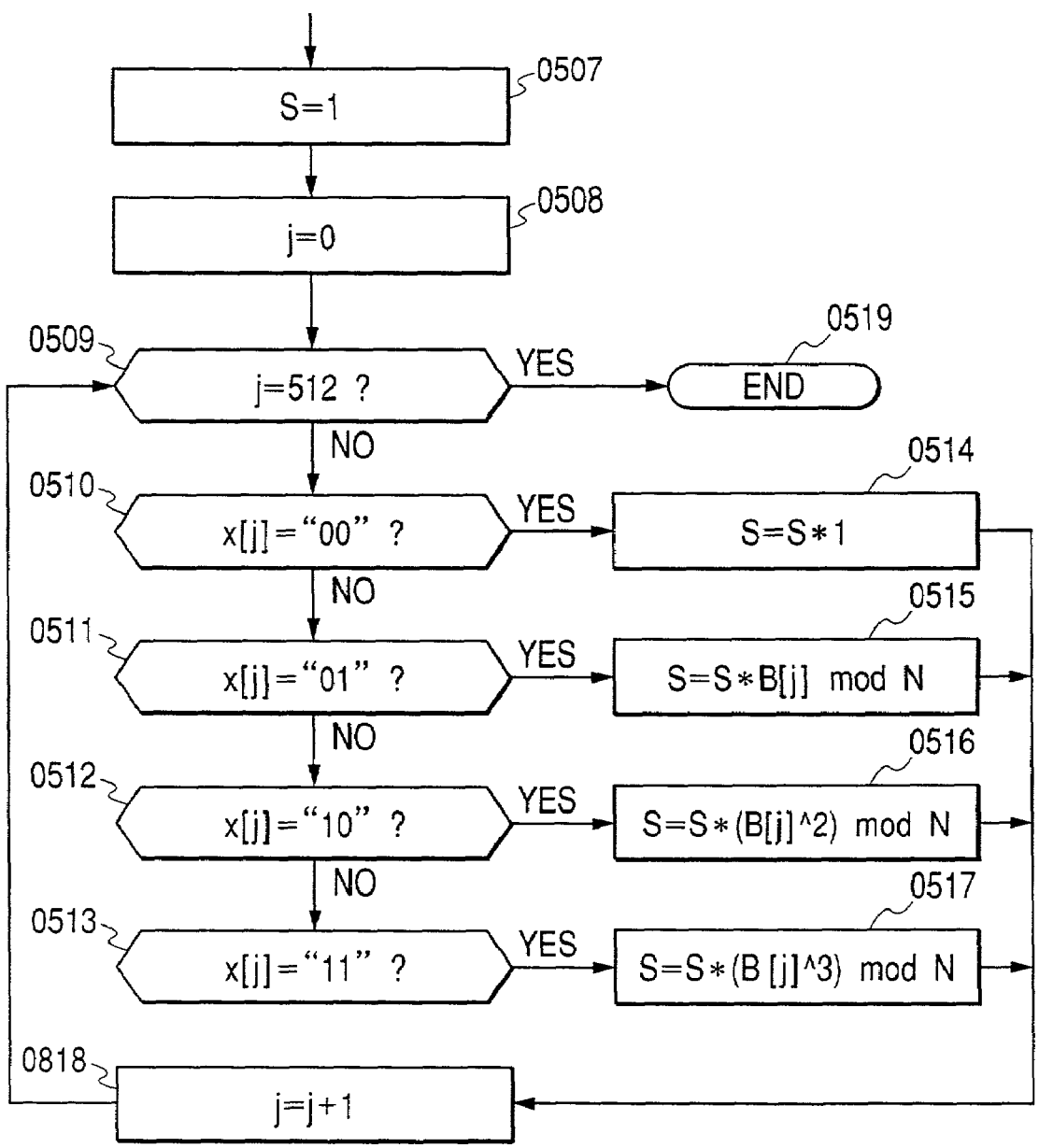
FIG. 6 continues from FIG. 5 showing the modulo multiplication part of the modular exponentiation operation using the addition chain method.
Figure 7:
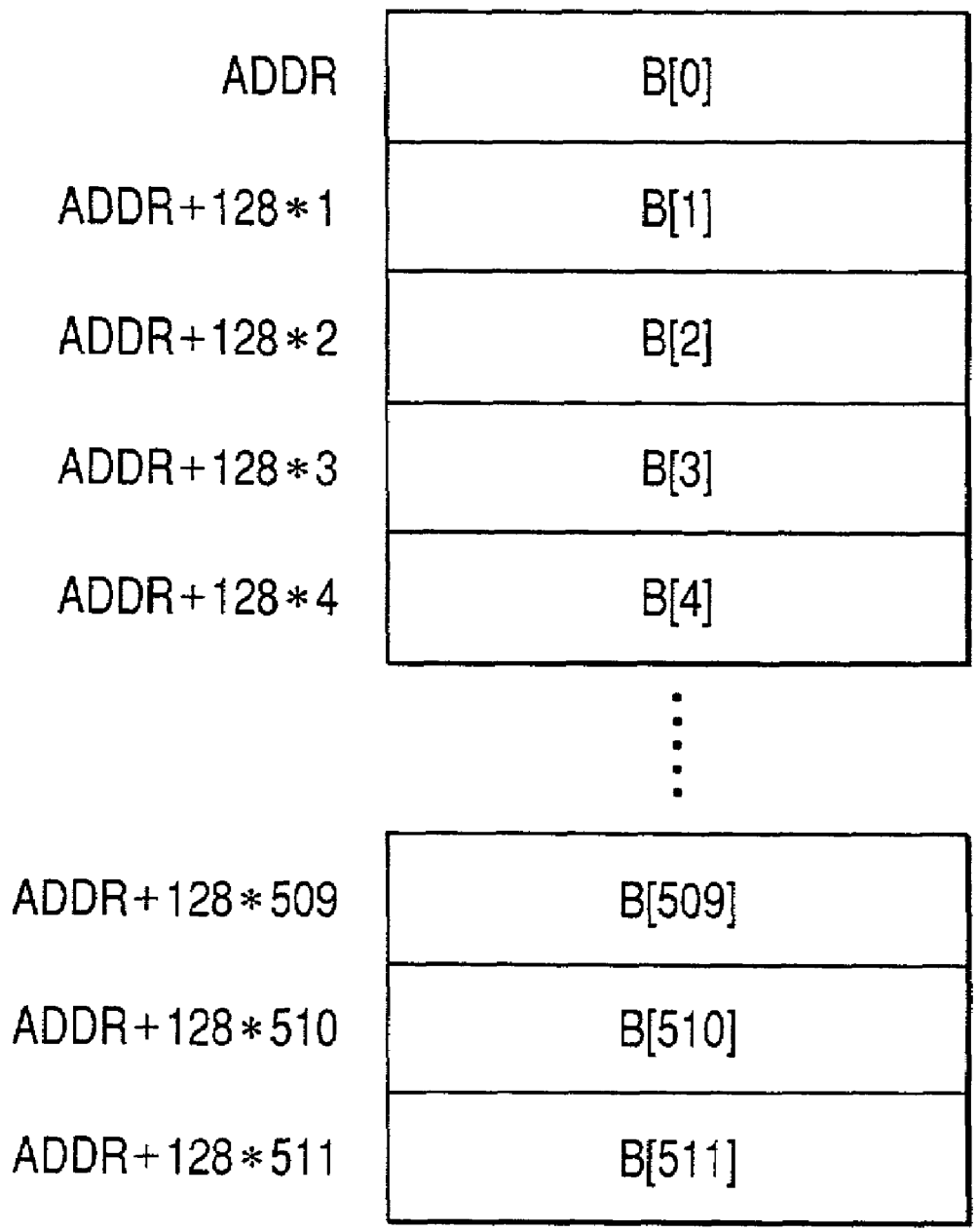
FIG. 7 is a diagram (modulo multiplication part) showing the memory layout of a table for modular exponentiation operation using the addition chain method.

Next, another implementation method of RSA encryption different from the addition chain method is described below. This is shown in FIGS. 5 to 7. The bottom of a flowchart of FIG. 5 continues to the top of FIG. 6. This implementation method is possible when the RAM capacity of a microcomputer is sufficiently large. It is assumed herein that modular exponentiation operation of 1024 bits is performed. Hereinafter, binary representation of x is written as (x[0]x[1] . . . x[511]). x[j] is a 2-bit block that is equal to one of 00, 01, 10, and 11.

First, B[j]=y^(4^(511−j)) mod N (j=0, 1, . . . , 511) table is created. S is initialized to y (0501) and counter j is set to 512 (0502). The value of 512 is a value resulting from dividing 1024 bits by 2. In this example, this value is used because the processing is performed per every 2 bits, but for a 4-bit processing, a value 256 (=1024/4) is used. This is also true for other cases (ex. window widths of powers of 2).

Next, a conditional branch processing 0503 is performed. The conditional branch processing judges an end condition. If the end condition is not satisfied, S is stored on RAM in 0504. Hereinafter, the value of S for a counter j is written as B[j−1]. In this case, B[0], B[1], . . . , and B[511] are stored such that they do not overlap with each other on RAM. For example, as shown in FIG. 7, they are placed contiguously every 1024 bits (128 bytes). It is assumed herein that addresses are assigned in units of 2 bytes. Since the size of data is 128 bytes (=1024 bits), the data is placed at table addresses of a 128-byte increment. Therefore, there is no overlap. After they are stored, the embodiment calculates S to the fourth power modulo N in 0505, the counter j is decremented in 0506, and the control returns to the conditional branch processing 0503. Then this operation is repeated 512 times until the end condition is satisfied. By this operation, for counter j=512, B[511] is set to y, and for j=511, B[510] is set to y^4 mod N. In the same way, for the counter j, B[j−1] is set to y^(4^(512−j)) mod N. The above described operation depends only on data size but not on each bit of exponent x.

When the end condition of the conditional branch processing 0503 is satisfied, S is initialized to 1 in 0507. In 0508, the counter j is set to 0. In conditional branch processing 0509, if j is equal to 512, the processing terminates (0519). If the end condition is not satisfied, the value of x[j] is checked (0510, 0511, 0512, and 0513), and processings of 0514, 0515, 0516, and 0517 are performed for the respective condition branches. Thereafter, in 0518, the counter is incremented, and the control returns to the conditional branch processing 0509. This processing is repeated 512 times.

The reason that correct results are obtained by this processing is that, in the processings of 0514, 0515, 0516, and 0517, since S is multiplied by C[j]=B[j]^x[j] mod N (j=0, 1, 2, . . . , 511), upon termination of all processings, the following expression $$S = C[0] * C[1] * \ldots * C[511] \bmod N$$
$$= (y^{\wedge}(x[0]*4^{\wedge}511))*(y^{\wedge}(x[1]*4^{\wedge}510))*\ldots*(y^{\wedge}x[511]) \bmod N$$
$$= y^{\wedge}(x[0]*4^{\wedge}511 + x[1]*4^{\wedge}510 + \ldots + x[511]) \bmod N$$
$$= y^{\wedge}x \bmod N$$

is satisfied.

Even in the case where this processing is used, key information may leak by power analysis, for the same reason as for the normal addition chain method.

Next, the elliptic curve encryption will be described briefly.

An elliptic curve is a set of zero points of a cubic polynomial defined on a field F, and has a standard form of $$y^2=x^3+ax^2+bx+c$$

when the characteristic of F is not 2. On a filed having a characteristic of 2, an elliptic curve has a standard form of $$y^2+cy=x^3+ax+b \text{ or}$$

$$y^2+xy=x^3+ax+b.$$

Figure 8:
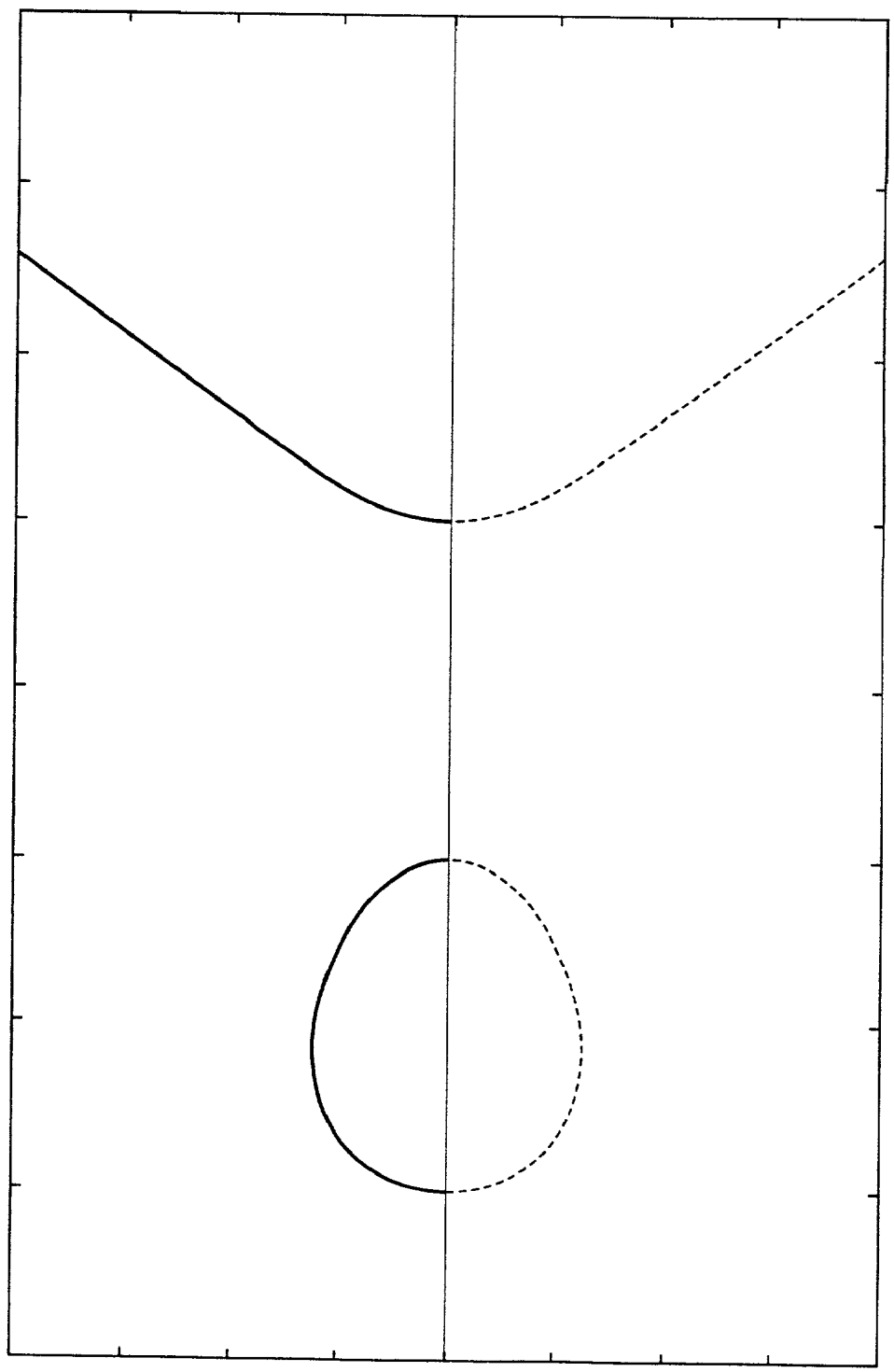
FIG. 8 is a drawing showing the shape of an elliptic curve.

In either case, 0 (the point at infinity described later) is considered. The shape of an elliptic curve with an expression of y^2=x^3+3x is as shown in FIG. 8. The shape of an elliptic curve changes greatly depending on coefficients. Usually, the elliptic curve encryption requires that a cubic expression on the right side has no multiple root. FIG. 8 shows an elliptic curve on a real number field. The shape of an elliptic curve on a field other than a real number field may differ.

In the present invention, since whether a characteristic is 2 or not is not essential, for simplicity, the following discussion regards a characteristic other than 2, and only a case of finite fields is described because encryption requires only finite fields. A field consisting of a finite number of elements is referred to as a finite field or a Galois field, whose structure is well known. The simplest structure of it is described below.

Consider a quotient ring Z(p) of an integer ring for a prime number p. Since elements other than 0 have inversion, Z(p) has a structure of field. This is referred to as a prime field and written as GF(p). This is an example of the most primitive finite field.

Next, consider a polynomial f(X) having elements of GF(p) as coefficients. A new field can be formed by adding its zero points not contained in GF(p) to GF(p). This is referred to as an algebraic extended field of finite degree of GF(p). It is known that the number of elements of an algebraic extended field of finite degree of GF(p) is a power of p. When the number of the elements is written as q, the algebraic extended field of finite degree may be represented as GF(q).

Figure 9:
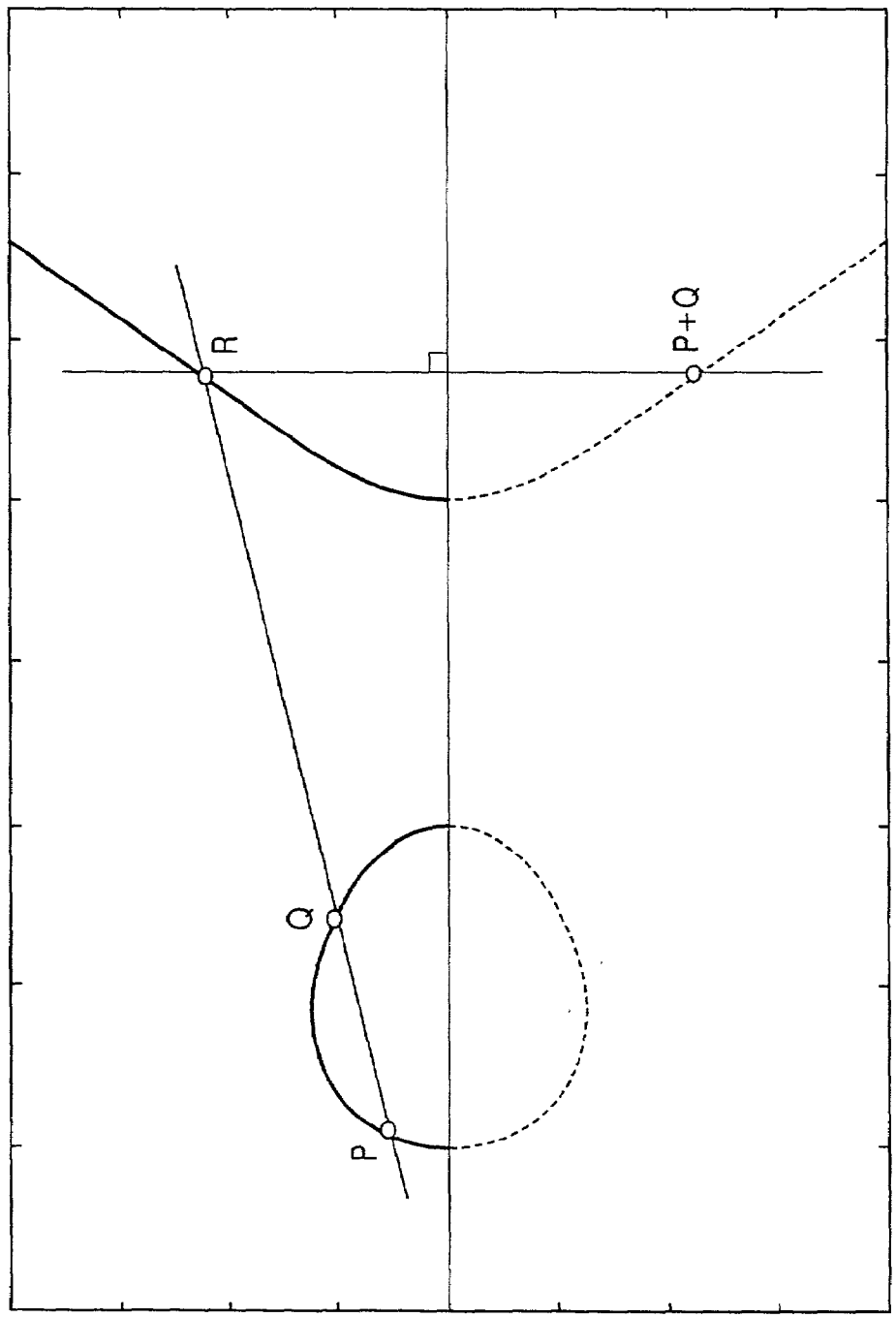
FIG. 9 is a drawing for explaining addition on an elliptic curve.

An arithmetic operation can be defined between points on an elliptic curve. As shown in FIG. 9, when two points P and Q exist on an elliptic curve, a straight line passing through the two points is drawn (when P=Q, a tangent line is drawn), and a point resulting from folding back a point R at which the line again intersects with an elliptic curve symmetrically with respect to an x axis is again a point on the elliptic curve because of the symmetry of the curve. This point is written as P+Q, which is defined as the sum of P and Q. If there is no intersecting point and the point at infinity is conceived as a virtual point, the line is considered to intersect at the virtual point. The point at infinity is written as 0. Although there are many methods of representing point data, projective coordinates are used herein. Conversion from normal coordinates to projective coordinates is performed as follows, for example. Let H be a set with an origin removed from a normal two-dimensional plane. For coordinates (x, y) of a point of H, x and y are replaced by X/Z and Y/Z, which are considered to be a three-dimensional point of (X, Y, Z). For scalar c (other than zero), (cX, cY, cZ) corresponds to an identical point on H. Conversely speaking, all points that can be written as (cX, cY, cZ) (c is not 0) in a three-dimensional space can be considered equivalent to points in H. In a projective space, points represented in the form of (X, Y, 0) (correctly, their equivalent class) correspond to 0 (the point at infinity). (Generally, algebraic varieties, including elliptic curves, are often considered on a projective space.) A point P symmetric with a point P on an elliptic curve with respect to the x axis is referred to as an inverse of P and represented as −P. k additions of a point −P in G(E/GF(q)) are written as kP, and k additions of −P are written as −kP, indicating scalar multiplication of P, respectively. These coordinates can be represented by rational expressions of coordinates of P and Q. Therefore, the arithmetic operations can be applied on general fields. The addition satisfies an associative law and a commutative law like normal additions. With respect to the addition, 0 (the point at infinity) plays a function of zero as in normal arithmetic operations, and −P becomes 0 when added with P. This indicates that addition operations on an elliptic curve have a structure of commutative group (abelian group). This may be referred to as Mordell-Weil group. A Mordell-Weil group, when an elliptic curve E and a field of definition GF(q) are fixed, may be written as G(E/GF(q)). The structure of G(E/GF(q)) is very simple and is known to have the same form as a direct product of a cyclic group or two cyclic groups.

Generally, even if the value of kP=Q is found, it is not easy to find the value of k because of an enormous amount of computation. This is referred to as a discrete logarithm problem on an elliptic curve. The elliptic curve encryption is based on the fact that a discrete logarithm problem on an elliptic curve is difficult.

Although various encryption methods take advantage of elliptic curves, the elliptic Elgamal method will be described herein as an example.

It is assumed that an elliptic curve E and a point P (generally a point having a large order called a base point) thereon are publicized.

Consider the case where A sends secret information M to B (the secret information is represented by points on an elliptic curve. The embedding of plaintext (cryptogram) on an elliptic curve is described in N. Koblitz: "A Course in Number Theory and Cryptograph", second edition, Graduate Texts in Mathematics 114, Springer-Verlag, 1987).

STEP 1. Recipient B selects a positive integer x[B], holds it as a secret key, and registers $$Y[B]=X[B]P$$

in a public key directory.

STEP 2. Sender A uses a random number "r" and sends $$C1=rP$$

$$C2=M+rY[B]$$

to B.

STEP 3. The recipient B receives C1 and C2 and uses his secret key X[B] to restore M as

C2 X[B]C1=M.

Not only in the elliptic Elgamal encryption, but also in the elliptic curve encryption, scalar multiplication of points on an elliptic curve must be computed.

Figure 10:
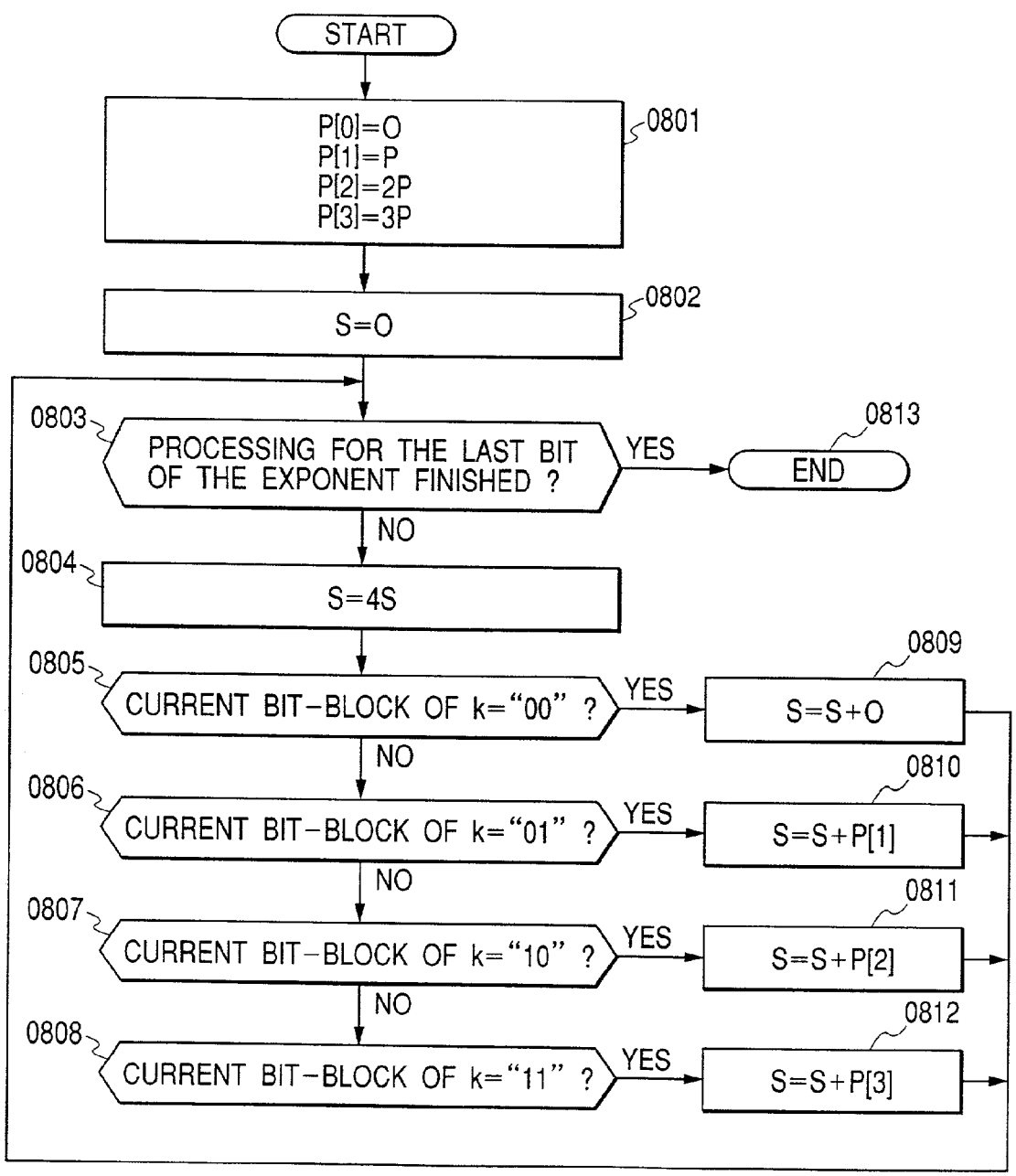
FIG. 10 is a flowchart of scalar multiplication computation using the addition chain method.

The algorithm for finding scalar times of points on an elliptic curve is similar to an algorithm for modular exponentiation operation. FIG. 10 shows a standard algorithm for computing kP (k is a positive integer) per every 2 bits as in the modular exponentiation operation. (The processing procedure is exactly the same). This processing method is also referred to as the addition chain method. (However, when implemented by a computer, the respective computations would be significantly different from those in RSA.)

First, to process 2 bits at a time, a lookup table for reception points P is created. In modular exponentiation operation, correspondingly to 0-th power, first power, second power, and third power, P[0]=0 (the point at infinity), P[1]=P, P[2]=2P, and P[3]=3P are provided (0801). Next, the values of points for computation are initialized (0802). Next, an end condition is judged (0803). If the end condition is satisfied, the processing terminates (0813). Otherwise, S is quadrupled (0804), a conditional branch is made according to the value of bits of k (every 2 bits) (0805, 0806, 0807, and 0808), and points P[0]=0, P[1], P[2], and P[3] corresponding to these values are added (0809, 0810, 0811, and 0812). kP is computed by continuing this processing until all bits of k are exhausted. This computation is performed in units of 2 bits from higher bit positions of k. This computation has a structure mathematically identical with the modular exponentiation operation. As described later, it is conceivable that modular exponentiation operations in RSA and addition operations on elliptic curves are performed on Z(N) and G(E/GF(q)) algebraic systems, respectively, and it is very unnatural to extend these operations to more common algebra systems. A method of computer operations in this case is generally processed by the algorithm described herein.

On the other hand, while a microcomputer is executing an internal program, since internal power consumption thereof may leak, the process implemented by the microcomputer for processing of the secret key would leak accordingly. For example, since the branch is made according to differences of bits of k (every 2 bits in this example), if the processing appears as differences of power consumption, bits of k could be determined from power waveforms.

The same as the RSA encryption, the elliptic curve encryption has points in the form of 4^mP computed in advance by the addition chain method and placed in a lookup table in a memory. The elliptic curve encryption is extremely advantageous in terms of implementation in comparison with the RSA encryption in that the values of the points are completely independent of each input. For the RSA encryption, not only a table must be created for each input, but also the table values must be put on RAM. For the elliptic curve encryption, the table values can be put in advance on a nonvolatile memory, such as ROM and EEPROM, because they are independent of input. This is also very advantageous in saving computation time.

Figure 11:
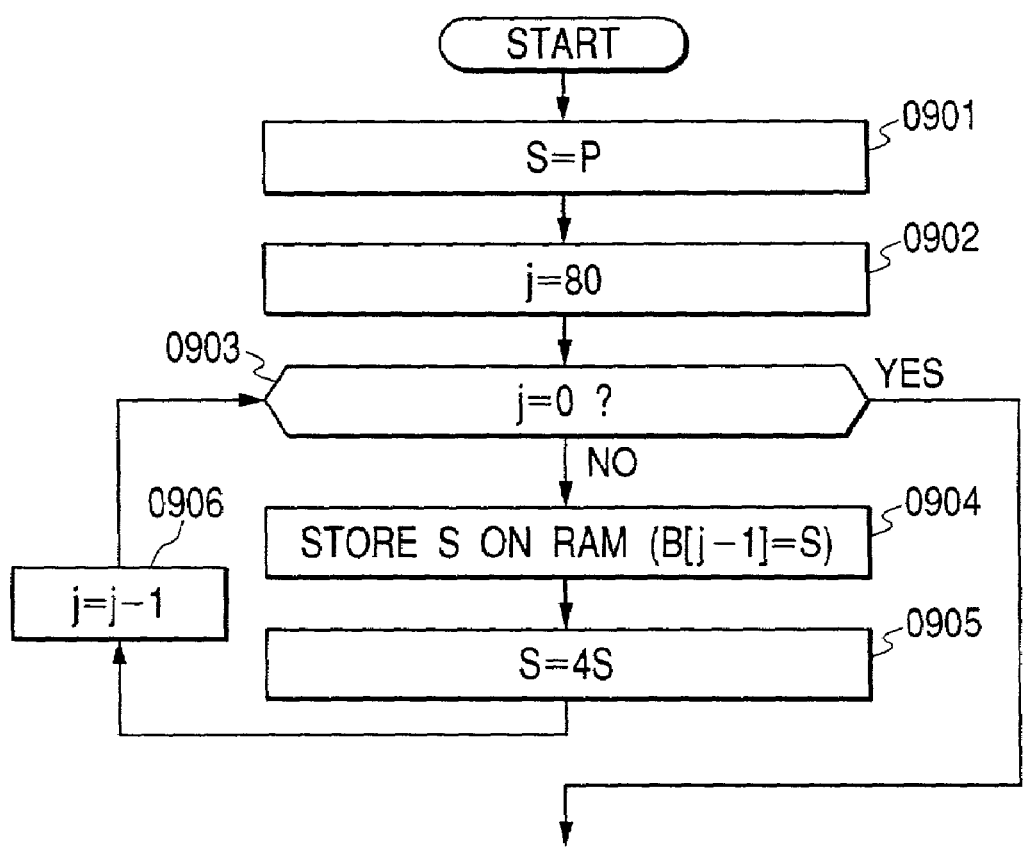
FIG. 11 is a flowchart showing the table creating part of the scalar multiplication computation on points on an elliptic curve.
Figure 12:
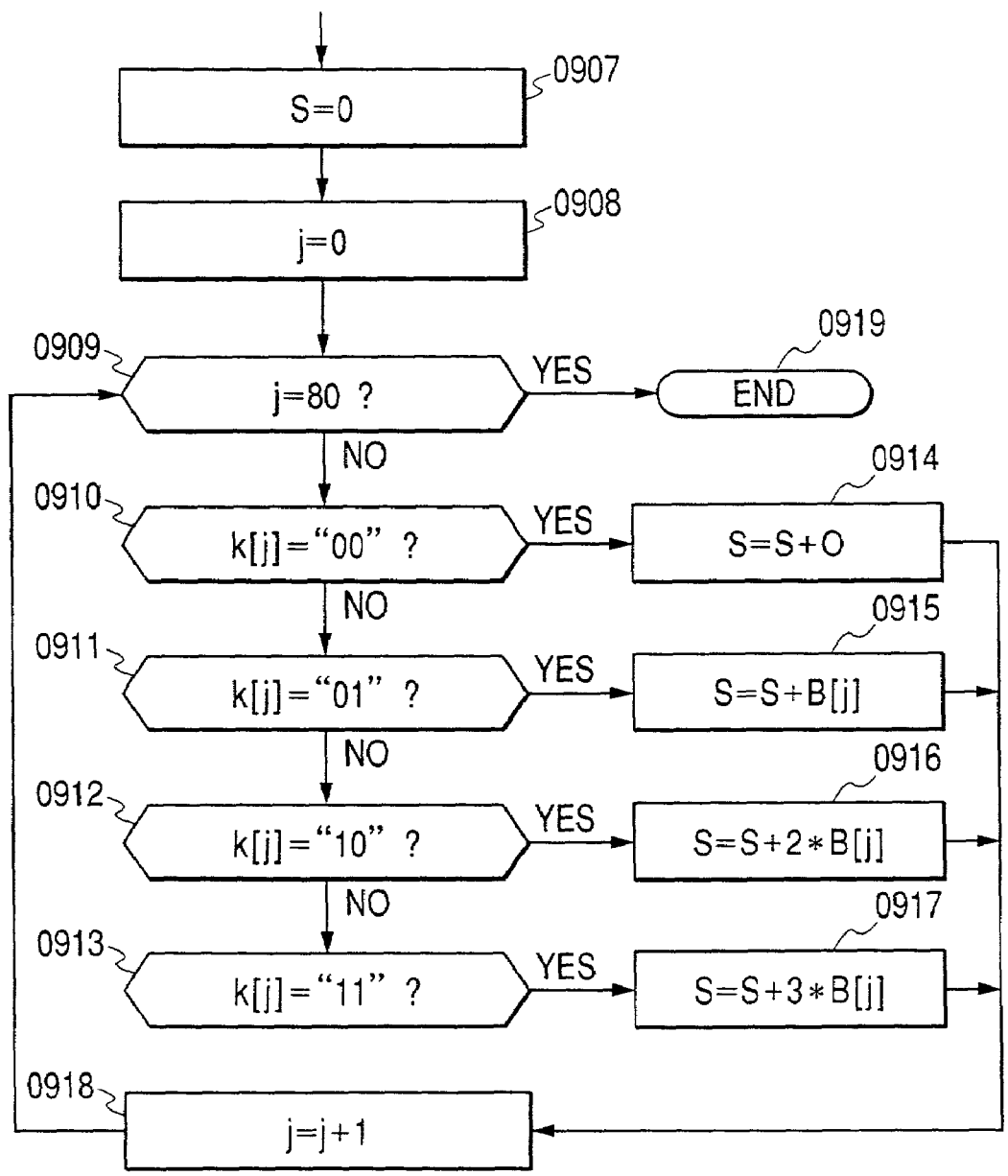
FIG. 12 continues from FIG. 11 showing the scalar dependent part of the scalar multiplication computation on points on an elliptic curve.

Flowcharts of the addition chain method using such a lookup table are shown in FIGS. 11 and 12. The bottom of the flowchart of FIG. 11 continues to the top of FIG. 12.

Herein, 160-bit scalar multiplication computation is performed. It is known that a key length of 160 bits in the elliptic curve encryption corresponds to a key length of 1024 bits in the RSA encryption. Hereinafter, binary representation of k is written as (k[0]k[1] . . . k[79]), where k[j] is a 2-bit block that is equal to one of 00, 01, 10, and 11.

Table B[j]=(4^(79-j))P(j=0, 1, . . . , 79) is computed before being stored in EEPROM, or can be computed each time (processing in FIG. 11 is unnecessary). In this example, although it is redundant in reality, a table is computed each time, for comparison with the RSA encryption.

S is initialized to P (0901), and a counter j is set to 160 (0902). The value of 80 is a value resulted from dividing 160 bits by 2. In this example, this value is used because processing is performed in units of 2 bits, but for 4-bit processing, a value 40 (=160/4) is used. This is also true for other cases (window widths of powers of 2).

Next, a conditional branch processing 0903 is performed. The conditional branch processing judges an end condition. If the end condition is not satisfied, S is stored on RAM in 0904. Hereinafter, the value of S for the counter j is written as B[j-1]. In this case, B[0], B[1], . . . , and B[79] are stored such that they do not overlap with each other on RAM. An example of how they are stored is obtained by replacing portions of 128 bytes by 10 bytes in the placement diagram of FIG. 7 for the RSA encryption. After they are stored, in 0905, S is quadrupled in the sense of an arithmetic operation on an elliptic curve. After the quadruple operation, the counter j is decremented in 0906, and the control returns to the conditional branch processing 0903. Hereinafter, this operation is repeated for 80 times until the end condition is satisfied. By this operation, for counter j=80, B[79] is set to P. And for j=79, B[78] is set to 4P. In the same way, for the counter j, B[j-1] is set to (4^(79-j))P.

If the end condition of the conditional branch processing 0903 is satisfied, in 0907, S is initialized to 0 (the point at infinity). In 0908, the counter J is set to 0. If the conditional branch processing 0909 determines j to be 80, the processing terminates (0919). If the end condition is not satisfied, the values of k[j] are checked in 0910, 0911, 0912, and 0913 to respectively perform processings 0914, 0915, 0916, and 0917 according to the conditional branches. Thereafter, in 0918, the counter is incremented, and the control returns to the conditional branch processing 0909. This operation is repeated 80 times.

The reason that correct results are obtained by this processing is that, in the processings of 0914, 0915, 0916, and 0917, since S is added with (in the sense of addition on an elliptic curve)

$$C[j]=k[j]*B[j] \ (j=0, 1, 2, \ldots, 79),$$

upon termination of all processings, the following expression $$S = C[0] + C[1] + \ldots + C[511]$$
$$= k[0]*(4^{\wedge}79)P + k[1]*(4^{\wedge}78)P + \ldots + k[79]P$$
$$= (k[0]*4^{\wedge}79 + k[1]*4^{\wedge}78 + \ldots + k[79])P$$
$$= kP$$

is satisfied.

Scalar multiplication arithmetic operations on the above described elliptic curve may be performed using different coordinate systems. Accordingly, points within the microcomputer may be represented differently between the coordinate systems. Algebraically, since two bi-rationally equivalent curves afford the same structure of Mordell-Weil groups, the above described algorithms are intrinsically identical.

With the above in mind, one embodiment of the invention is described with reference to FIGS. 13 to 16. A flowchart continues from FIGS. 13 to 15. In this embodiment, an RSA encryption processing (modular exponentiation operation) S= y^x mod N of 1024 bits is performed.

Figure 13:
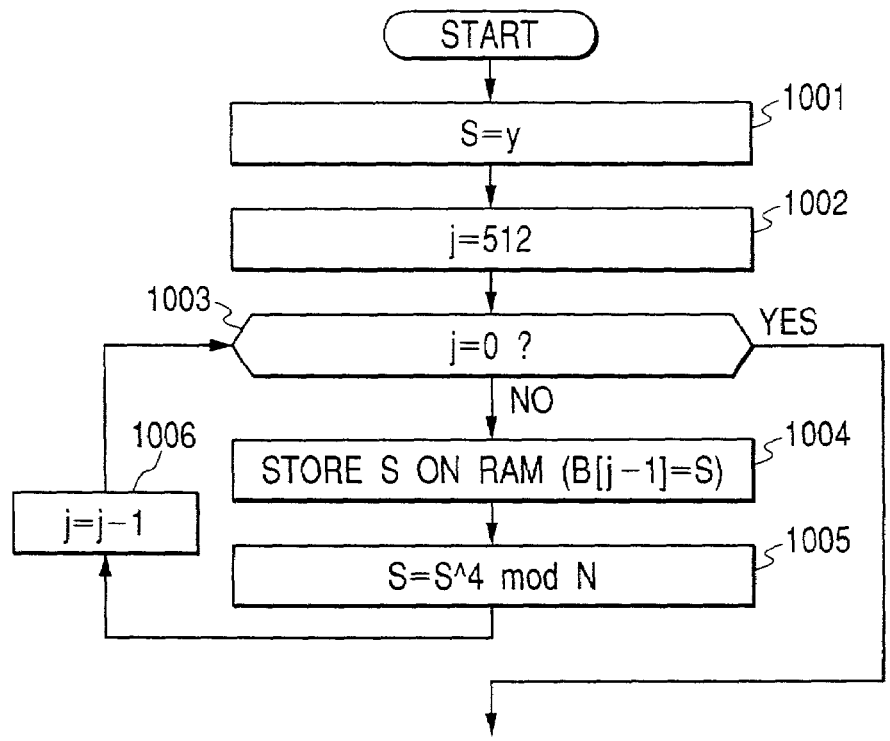
FIG. 13 illustrates one embodiment of the present invention by a flowchart of the RSA encryption processing (table creating part)
Figure 14:
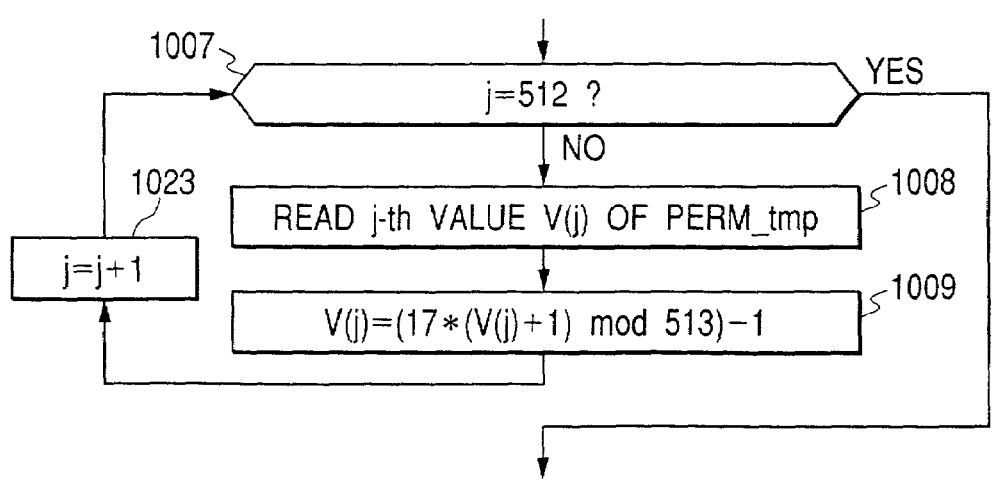
FIG. 14 continues from FIG. 13 showing the embodiment of the present invention (random permutation generating part)
Figure 15:
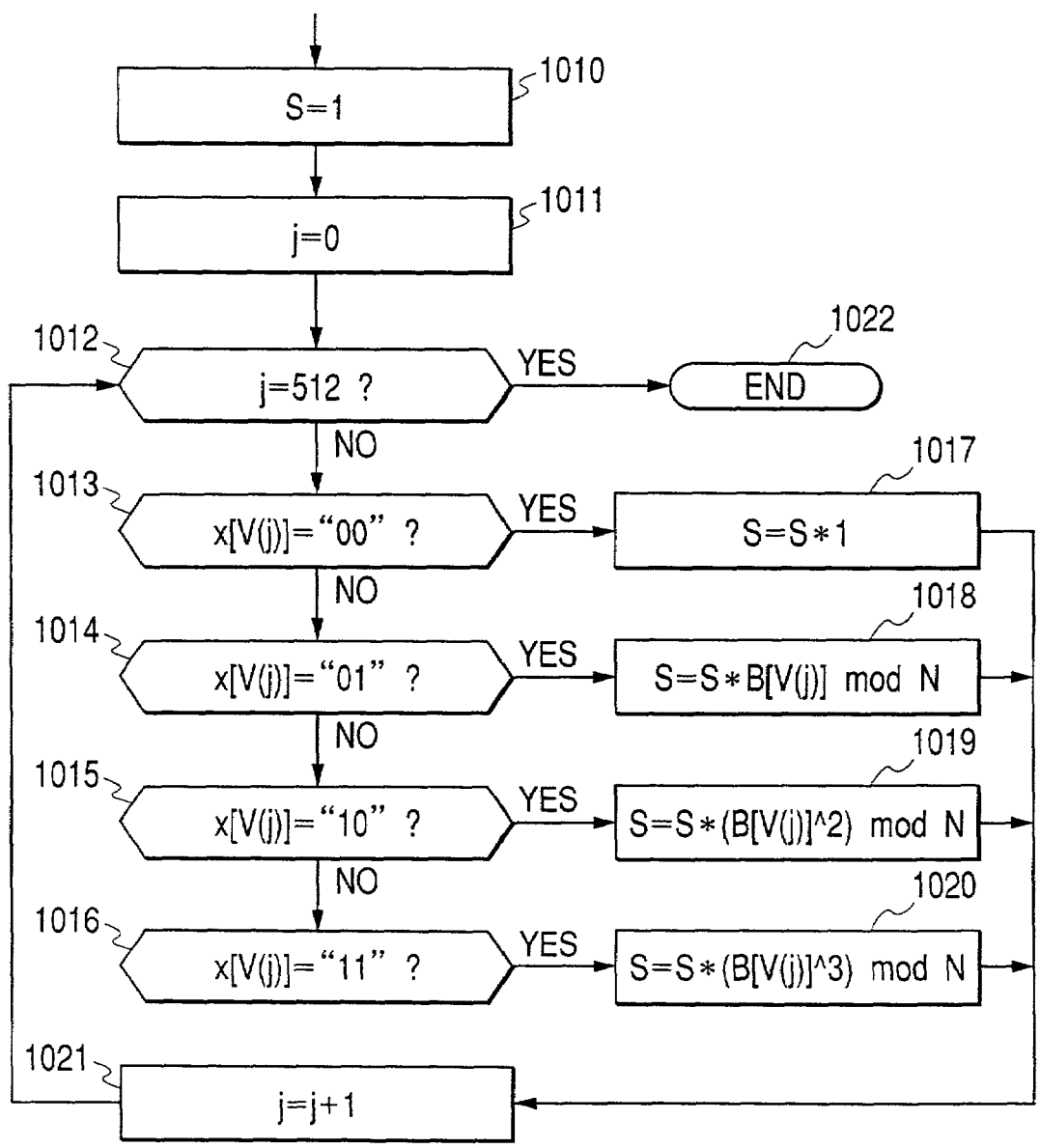
FIG. 15 continues from FIG. 14 showing the embodiment of the present invention (modular multiplication part)

FIG. 13 shows a processing for creating a table required for computation. First, S is initialized to y (1001), and a counter j is set to 512 (1002). Next, an end condition is judged in a conditional branch processing 1003. Next, S is stored in RAM (1004). (Hereinafter, when this value is written as B[j] for the counter j, B[j]s are placed such that they do not overlap with each other on the memory, as in the processing of FIGS. 5 to 7.) Next, the embodiment calculates S to the fourth power modulo N in 1005, the counter j is decremented in 1006, and the control returns to the conditional branch processing 1003 again. After this operation is repeated 512 times, the control transfers to processing 1007 of FIG. 14. In 1007, the condition for the counter j is judged again. This is an end judgment. If j is not 512, the processing proceeds to 1008. In 1008, j-th value V(j) is read from an EEPROM area PERM_tmp for random permutation as shown in FIG. 16. As shown in FIG. 16, V(j)s are stored beforehand with a random rearrangement of 0, 1, 2, . . . , 511. Next, in 1009, V(j) is rewritten to V(j)=((17* (V(j)+1)) mod 513)−1. (Although replacement is made for each j in this embodiment, some EEPROMs permit only replacement in pages, in which case V(j) of each page size should have been stored in RAM to make a collective replacement.) Operation of this portion will be described from a more common standpoint.

Consider conversion U(w)=a*w mod (n+1) defined on a set S(n)={1, 2, 3, . . . , n}. As easily seen from the Euclidean algorithm, when 'a' is prime to n+1, since 'a' has an inverse modulo n+1, for such 'a', the conversion U is bijectioned from S(1) to S(n). In other words, U is a rearrangement of 1, 2, 3, . . . , and n. Accordingly, U(w)=17*w mod 513 is bijectioned onto {1, 2, 3, . . . , 512} because 513=3*3*3*19 is prime to 17. Hence, the conversion ((17*(w+1) mod 513)−1 appearing in 1009 rearranges {0, 1, 2, . . . , 511}. Of course, the number of 17 is an example, and any other number prime to 513 may define a permutation of {0, 1, 2, . . . , 511}. Although other methods for generating a permutation are available, their description is omitted to avoid departing from the spirit of the present invention.

After processing of 1009, the counter j is incremented in 1023. This operation is repeated 512 times, then the control proceeds to the operation of 1010 in FIG. 15. In 1010, S is initialized to 1 again. The counter j is initialized to 0 (1011). Next, whether the counter j is 512 is judged in 1012. If the condition is satisfied, the processing terminates (1022). If the end condition is not satisfied, the conditional branch processings of 1013, 1014, 1015, and 1016 are performed. These processings read a V(j)-th value of secret exponent x to make conditional branches. The processings are performed with the value of V(j) subjected to a random permutation without directly using the counter value j. Processings of 1017, 1018, 1019, and 1020 are performed correspondingly to these conditional branch processings 1013, 1014, 1015, and 1016. In processings of 1018, 1019, and 1020, a modular multiplication processing is performed using B[V(j)] corresponding to the value of V(j). Upon termination of the processings of 1017, 1018, 1019, and 1020, the counter j is incremented (1021), and the control returns to the conditional branch processing 1012.

The reason that correct results are obtained by this processing is that, in the processings of 1017, 1018, 1019, and 1020, since S is multiplied by $$C[V(j)] = B[V(j)]^{\wedge}x[V(j)] \mod N (j=0, 1, 2, \ldots, 511),$$

upon termination of all processings, the following expression $$S = C[V(0)] * C[V(1)] * \ldots * C[V(511)] \mod N$$
$$= (y^{\wedge}(x[V(0)]*4^{\wedge}(511-V(0)))*(y^{\wedge}(x[V(1)]*$$
$$4^{\wedge}(512-V(1)))* \ldots *(y^{\wedge}(x[V(0)]*4^{\wedge}(511-V(511))) \mod N$$
$$= y^{\wedge}(x[V(0)]*4^{\wedge}(511-V(0)) + x[V(1)]*4^{\wedge}(512-V(1)) + \ldots +$$
$$x[V(511)]*4^{\wedge}(511-V(511)) \mod N$$

is satisfied.

Because of the nature of mapping V, since V(0), V(1), . . . , V(511) is an rearrangement of 0, 1, . . . , 511, the above described exponent part x[V(0)]*4^(511−V(0))+x[V(1)]*4^(512−V(1))+ . . . +x[V(511)]*4^(511−V(511)) is equal to x[0]*4^511+x[1]*4^510+ . . . +x[511]. Accordingly, S is equal to y^x mod N.

The power consumption in this embodiment differs significantly from that in normal processing (processing shown in FIGS. 5 to 7). In the processing shown in FIGS. 5 to 7, since execution is made sequentially from higher bit positions, a secret key may be identified by judging differences of power consumption on a bit basis. On the other hand, in the processing of this embodiment, bit positions to be processed are disturbed by an unpredictable information source. Since bits of secret key x generally have a significantly equal number of values 0 and 1 on average and strings of 00, 01, 10, and 11 appear almost equally, a high effect of disturbance can be expected.

Next, the application of the present invention to the elliptic curve encryption is described.

The same method as modular exponentiation operations in RSA encryption is applicable to scalar multiplication processing on elliptic curves.

An embodiment shown in FIGS. 17 to 20 is for execution of 160-bit elliptic curve encryption processing (scalar multiplication operation for point P on an elliptic curve E) S=kP. An elliptic curve may be defined on whatever Galois fields, and they make no difference to the configuration of this embodiment. Hereinafter, field of definitions and the arithmetic operations on the field of definitions are not to be described individually.

Figure 17:
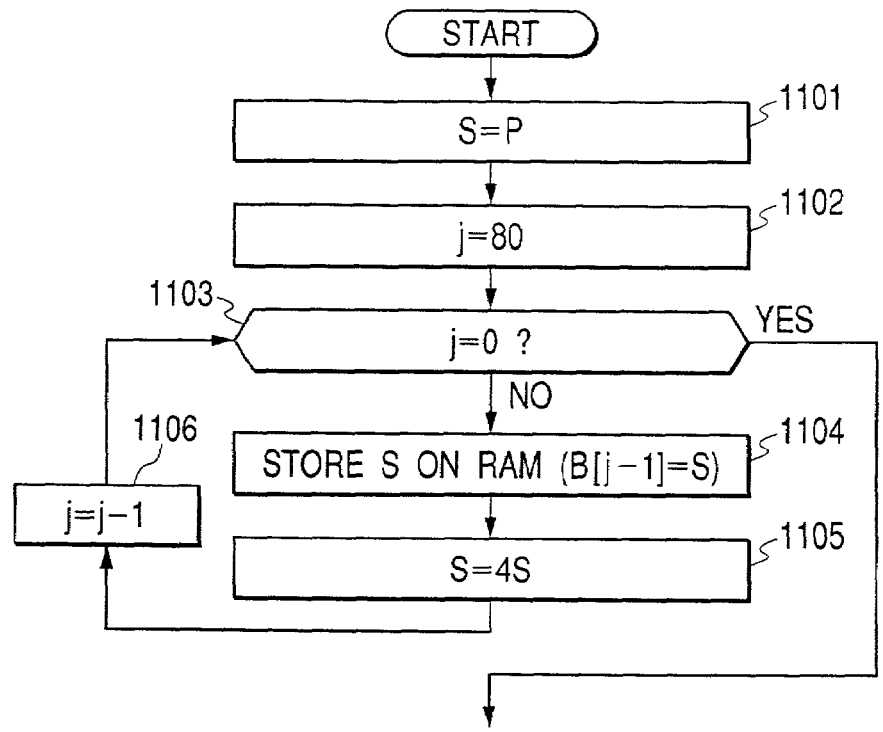
FIG. 17 is a flowchart of a first embodiment of elliptic encryption processing (table creating part) of the invention.
Figure 18:
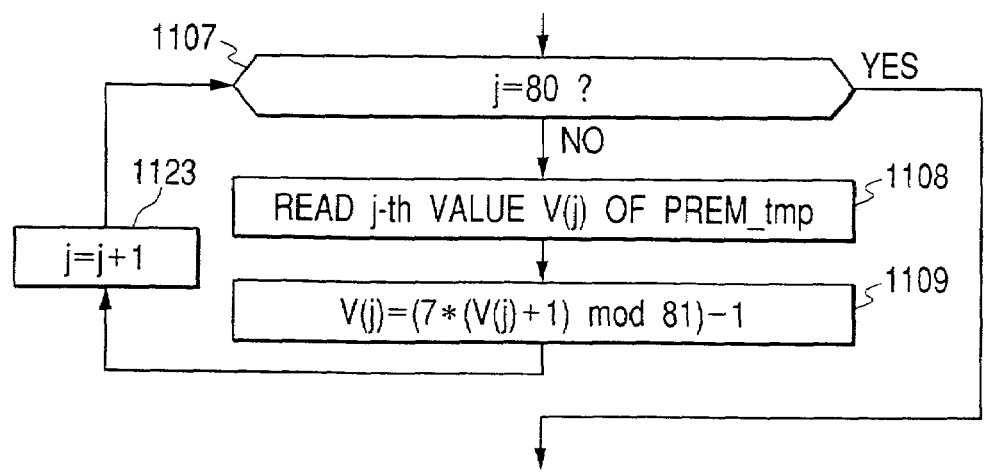
FIG. 18 continues from FIG. 17 showing the first embodiment of elliptic encryption processing (random permutation generating part) of the invention.
Figure 19:
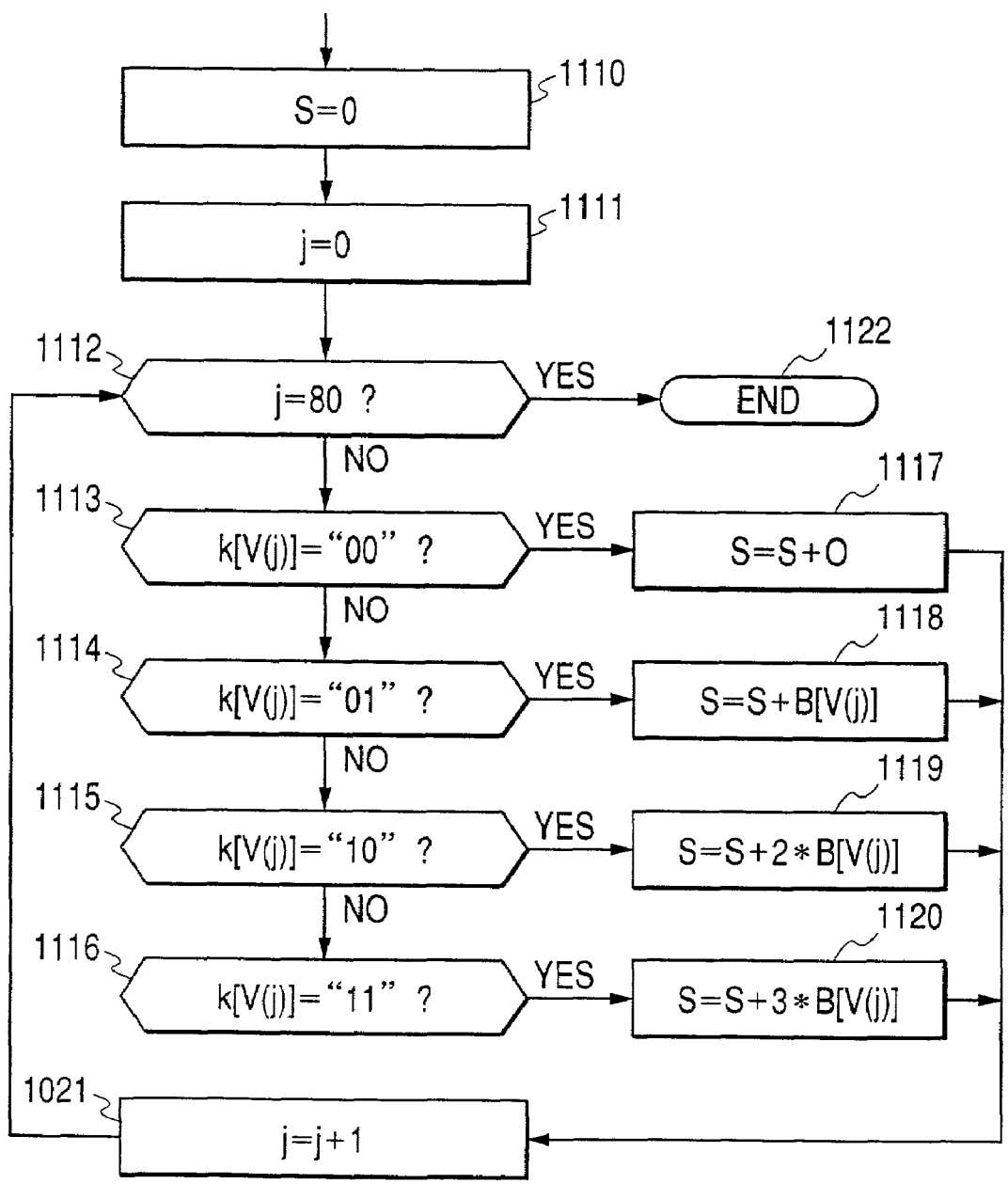
FIG. 19 continues from FIG. 18 showing the first embodiment of elliptic encryption processing (scalar dependent processing) of the invention.

FIG. 17 shows a processing for creating a table necessary for computation. S is initialized to a base point P (1101), and a counter J is set to 80 (1102). Next, an end condition is judged in a conditional branch processing 1103. Next, S is stored in RAM (1104). (Hereinafter, when this value is written as B[j] for the counter j, and B[j]s are placed such that they do not overlap with each other in the memory, as in the processing of FIGS. 5 to 7.) Next, S is multiplied by four on an elliptic curve E in 1105, the counter j is decremented in 1106, and the control returns to the conditional branch processing 1103 again. After this operation is repeated 80 times, the control transfers to a processing 1107 of FIG. 18. In 1107, the condition for the counter j is judged again. This is an end judgment. If j is not 80, the processing proceeds to 1108. In 1108, j-th value V(j) is read from an EEPROM area PERM_tmp for random permutation as shown in FIG. 20. As shown in FIG. 20, V(j)s are stored beforehand with a random rearrangement of 0, 1, 2, . . . , 79. Next, in 1109, V(j) is rewritten to V(j)=((7*(V(j)+1)) mod 81)−1. (Although the replacement is made for each j in this embodiment, some EEPROMs permit only replacement in pages, in which case V(j) of each page size should have been stored in RAM to make a collective replacement.) This operation rearranges {0, 1, 2, 3, . . . , 79}, as shown previously in the embodiment for the RSA encryption processing. Here, the number of 7 is only an example, and any number prime to 81 may define a permutation of {0, 1, 2, . . . , 81 }. Although other methods for generating a permutation are available, their description is omitted to avoid departing from the spirit of the present invention.

After a processing of 1109, the counter j is incremented in 1123. This operation is repeated 80 times, and the control proceeds to the operation of 1100 in FIG. 19. In 1010, S is initialized to 0 (the point at infinity) again. The counter j is initialized to 0 (1111). Next, whether the counter j is 80 is judged in 1112. If the condition is satisfied, the processing terminates (1122). If the end condition is not satisfied, the conditional branch processings of 1113, 1114, 1115, and 1116 are performed. These processings read a V(j)-th value of scalar k to make conditional branches. The processings are performed using the value of V(j) subjected to random permutation without directly using the counter value j. Processings of 1117, 1118, 1119, and 1120 are performed correspondingly to these conditional branch processings 1113, 1114, 1115, and 1116. In processings of 1118, 1119, and 1120, additions on an elliptic curve are performed using B[V(j)] corresponding to the value of V(j). After the termination of the processings of 1117, 1118, 1119, and 1120, the counter j is incremented (1121), and the control returns to the conditional branch processing 1112.

The reason that correct results are obtained by this processing is that, in the processings of 1117, 1118, 1119, and 1120, since S is added with $$C[V(j)]=B[V(j)]`x[V(j)] \bmod N(j=0, 1, 2, \ldots, 79)$$

on the elliptic curve, upon termination of all processings, the following expression $$\begin{aligned}S &= C[V(0)] + C[V(1)] + \ldots + C[V(511)] \\ &= (k[V(0)]*4^{\wedge}(79-V(0))P + (k[V(1)]*4^{\wedge}(79-V(1))P + \ldots + \\ &\quad (k[V(79)]*4^{\wedge}(79-V(79))P \\ &= (k[V(0)]*4^{\wedge}(79-V(0)) + k[V(1)]*4^{\wedge}(79-V(1)) + \ldots + \\ &\quad k[V(79)]*4^{\wedge}(79-V(79)))P\end{aligned}$$

is satisfied.

Because of the nature of mapping V, since V(0), V(1), . . . , V(79) is an rearrangement of 0, 1, . . . , 79, the above described scalar part k[V(0)]*4^(79−V(0))+k[V(1)]*4^(79−V(1))+ . . . +k[V(79)]*4^(79−V(79)) is equal to k[0]*4^79+k[1]*4 ^78+ . . . +k[79]. Accordingly, S is equal to kP.

The power consumption in this embodiment differs significantly from that in normal processing (processing shown in FIGS. 11 and 12). In the processing shown in FIGS. 11 and 12, since execution is made sequentially from higher bit positions, a secret key may be identified by judging differences of power consumption on a bit basis. On the other hand, in the processing of this embodiment, bit positions to be processed are disturbed by an unpredictable information source. Since bits of scalar k generally have a significantly equal number of values 0 and 1 on average and strings of 00, 01, 10, and 11 appear almost equally, a high effect of disturbance can be expected.

Although a scalar has so far used in a normal binary representation, another notation taking signs into account is also available. However, scalar notation departs from the spirit of the present invention. The reasons for this are described briefly.

An arithmetic operation of addition on an elliptical curve has an inverse. Taking advantage of this fact, the following variation is established $$(2^{\wedge}m-1)P=(2^{\wedge}m)P+(-P).$$

For example, although 195 can be written as 11000011 in binary notation, it is split to 2-bit blocks so as to be written as (11, 00, 00, 11). Since 11 is first encountered during examination from the lowest-order position, 1 is added to a higher-order position of 11 to make (11, 00, 01, 11). 11 in the highest-order position is again added with 1 in higher-order positions thereof to make (01, 11, 00, 01, 11). In such conversion, 11 is read as −1 for interpretation. That is, the number 195 is represented as follows:

Before conversion: 195=3*4^3+0*4^2+0*4+3

After conversion: 195=1*4^4+(−4^3)+0*4^2+1*4+(−1).

This is equivalent to a rewrite to 3=4−1. This is applied to scalar multiplication operation as follows:

$$195P=1*((4^{\wedge}4)P)-(4^{\wedge}3)P+0*((4^{\wedge}2)P)+1*4P-P.$$

Generally, such variation increases the bit length of a scalar. For example, in the above example, the 8-bit scalar increases to 10 bits. In this way, use of scalar representation increases the length of a scalar. However, for reasons such as an easy sign changing operation on an elliptic curve and limitations on the table size, the scalar multiplication operation may be implemented on an IC card.

Consider application of the present invention to such a variation. Hereinafter, a receiving point is P, the size of scalar k is 160 bits, and an arithmetic operation to be performed is kP.

The scalar k is represented as k' by the above described scalar representation method. Although the representation k' may be computed each time (scalar representation cannot be changed in implementation), it is prepared in advance in this example. Usually, k' is stored in EEPROM. Although the size of scalar k' may be larger than that in the original k representation, 160 bits are unchangeably used herein for simplicity.

Figure 21:
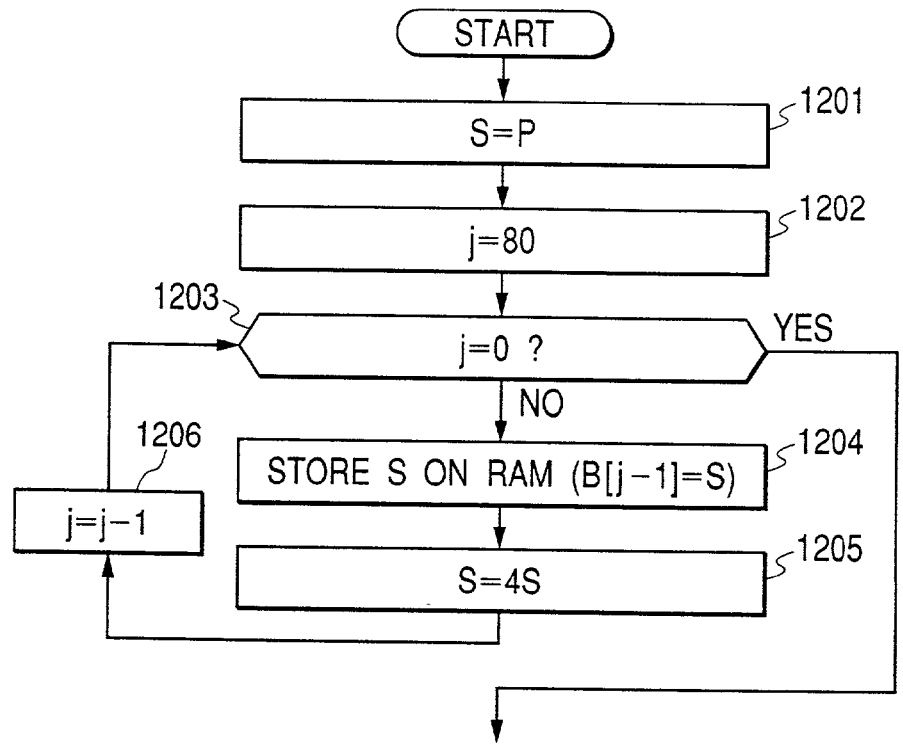
FIG. 21 is a flowchart of a second embodiment of elliptic encryption processing (table creating part) of the invention.
Figure 22:
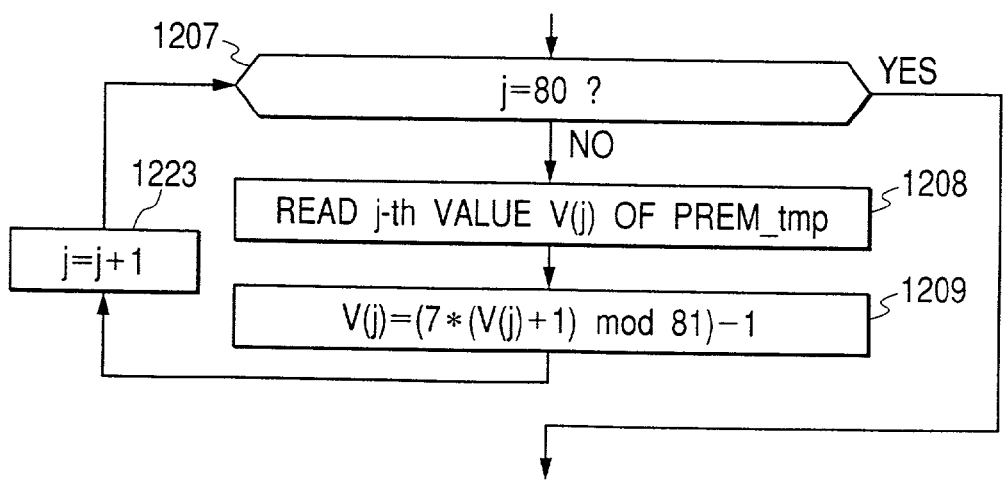
FIG. 22 continues from FIG. 21 showing the second embodiment of elliptic encryption processing (random permutation generating part) of the invention.

The following processing is performed after the above preparations have been made. First, according to processing of FIG. 21, B[j]=(4^j)P(j=0, 1, 2, . . . , 79) is computed, and a lookup table is created. S is initialized to a base point P (1201), and a counter j is set to 80 (1202). Next, an end condition is judged in a conditional branch processing 1203. Next, S is stored in RAM (1204). (Hereinafter, this value is written as B[j] for the counter j, and B[j]s are placed such that they do not overlap with each other in the memory, as in the processing of FIGS. 5 to 7.) Next, S is multiplied by four on an elliptic curve E in 1205, the counter j is decremented in 1206, and the control returns to the conditional branch processing 1203 again. After this operation is repeated 80 times, the control transfers to processing 1207 of FIG. 22. In 1207, the condition for the counter j is judged again. This is an end judgment. If j is not 80, the processing proceeds to 1208. In 1208, j-th value V(j) is read from an EEPROM area PERM_tmp for a random permutation as shown in FIG. 20. As shown in FIG. 20, V(j)s are stored beforehand with a random rearrangement of 0, 1, 2, . . . , 79. Next, in 1209, V(j) is rewritten to V(j)=((7*(V(j)+1)) mod 81)-1. This operation rearranges {0, 1, 2, 3, . . . , 79}, as shown previously in the embodiment for the RSA encryption processing. Of course, the number of 7 is only an example, and any other number prime to 81 may define a permutation of {0, 1, 2, . . . , 81}. Although other methods for generating a permutation are available, their description is omitted to avoid departing from the spirit of the present invention.

Figure 23:
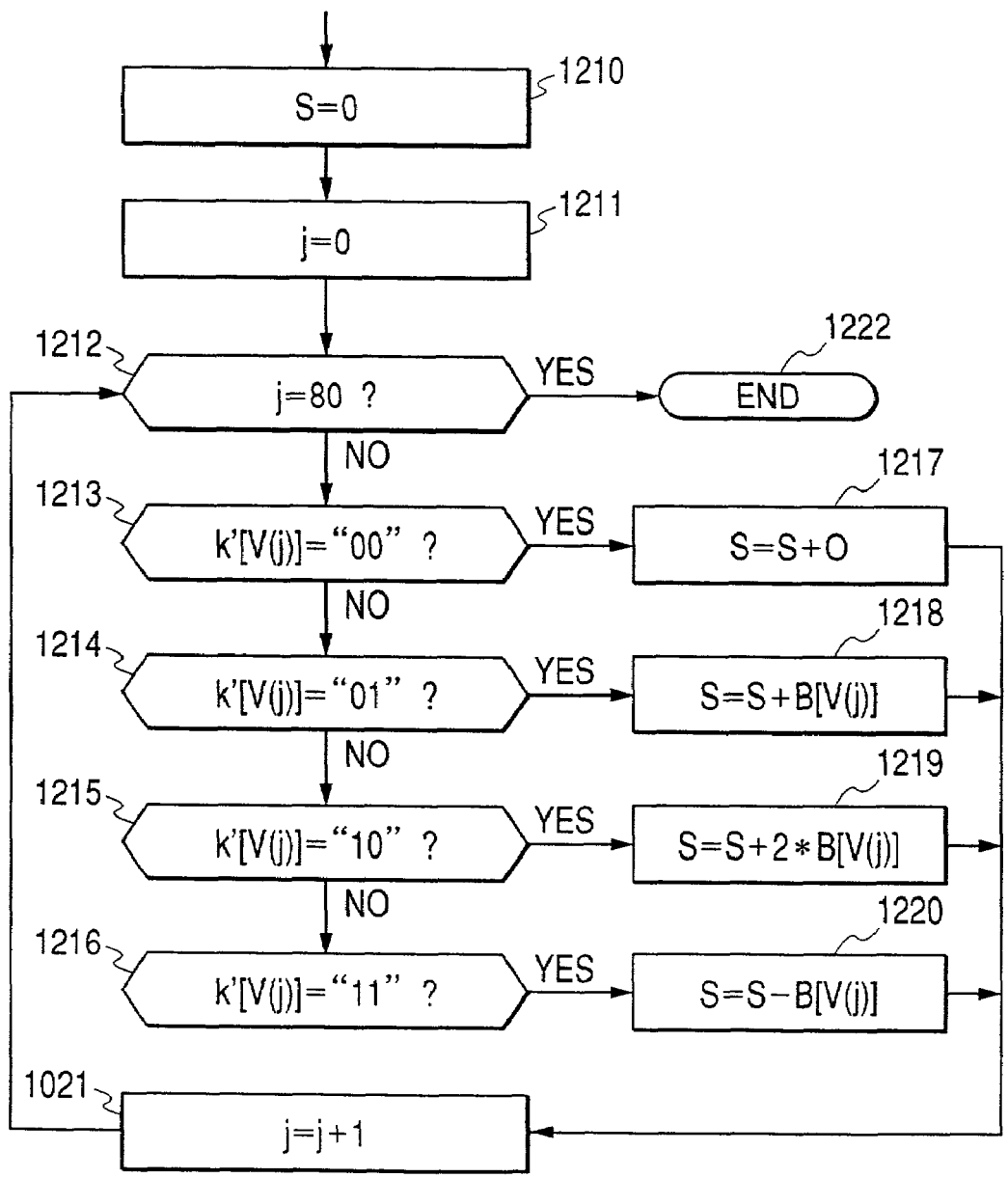
FIG. 23 continues from FIG. 22 showing the second embodiment of elliptic encryption processing (scalar dependent processing) of the invention.

After the processing of 1209, the counter j is incremented in 1223. This operation is repeated 80 times, and the control proceeds to the operation of 1210 in FIG. 23. In 1210, S is initialized to 0 (the point at infinity) again. The counter j is initialized to 0 (1211). Next, whether the counter j is 80 is judged in 1212. If the condition is satisfied, the processing terminates (1222). If the end condition is not satisfied, the conditional branch processings of 1213, 1214, 1215, and 1216 are performed. These processings read a V(j)-th value of scalar k' to make conditional branches. It is to be noted that the processings are performed with the value of V(j) subjected to random permutation without directly using the counter value j. Processings of 1217, 1218, 1219, and 1220 are performed correspondingly to these conditional branch processings 1213, 1214, 1215, and 1216. In processings of 1218, 1219, and 1220, additions on an elliptic curve are performed using B[V(j)] corresponding to the value of V(j). In 1220, unlike the example of FIGS. 17 to 20, -B[j] is added instead of 3*B[j] (subtracted by B[j]). Only this point is different from the example of FIGS. 17 to 20. After the termination of the processings of 1217, 1218, 1219, and 1220, the counter j is incremented (1221), and the control returns to the conditional branch processing 1212. The reason that correct results are obtained by this processing is the same as that in the embodiment of FIGS. 17 to 20. The bit disturbance effect is also the same.

Although all bits of secret key exponent and scalar are disturbed in the above embodiment, bit positions to be disturbed can be selected. For example, in the above embodiment, the present invention can also apply to the scalar from the high-order 16 bit position thereof to the 80-th bit position. This is because if only the pertinent portion is fetched, the processing in the embodiment is equivalent to scalar multiplication processing.

As has been described above, the ideas of the embodiments of the present invention to modular exponentiation operations and additions on an elliptic curve are exactly the same in principle, and it is natural to apply the principle into actual implementation.

In the embodiments of modular exponentiation operations modulo N and additions on an elliptic curve, if a product or an addition operation is written as ○, exactly the same flowchart can be formed. These flowcharts are also applicable to processing including the above modular exponentiation operations and the scalar multiplication of points on an elliptic curve, which has a similar algebraic structure.

According to the present invention, by changing a processing order in an IC card chip without affecting results, it becomes difficult to estimate the processing and a secret key based upon the waveforms of power consumption.

The foregoing invention has been described in terms of preferred embodiments. However, those skilled in the art will recognize that many variations of such embodiments exist. Such variations are intended to be within the scope of the present invention and the appended claims.

What is claimed is:

1. A method for countering unauthorized decryption comprising a step of scrambling at least one correlation between a data decryption processing in a hardware and at least one respective hardware operational phenomenon by randomly changing at least one arithmetic operation order in the data decryption processing, wherein the correlation is scrambled by an arithmetic operation method implemented by an information processing apparatus comprising the steps of:

for two integers K1 and K2, when finding a value F(K, A) of a function F satisfying F(K1+K2,A)=F(K1, A) ○ F(K2, A) (○ denotes an arithmetic operation in a communtative semigroup S. K designates an integer and A designates an element of S), decomposing the K to the sum of m integers K[0]+K[1]+. . . K[m−1];

using T(0), T(1), . . . T(m−1) resulted from rearranging a string of integers 0, 1, . . . m−1 by permutation T; and operating on terms F(K[T(0)], A) to F(K[T(m−1)], A) on the right side of F(K, A)=F(K[T(0)], A) ○F(K[T(1)], A) ○ . . . F(K[T(m−1)], A) . . . ("expression 1") in an order of F(K[T(0)], A), F(K[T(1)], A), . . . F(K[T(m−1)], A) to find F(K, A).

2. The method according to claim 1, whereby the permutation processing, the permutation T prevents predicting any post-permutation data from pre-permutation data, or the permutation T is performed based on a dummy random number, and whereby the permutation processing is performed each time the expression 1 is performed.

3. The method according to claim 1, wherein the S is a commutative semigroup in which, for a set consisting of residues by an integer N (N≧2), the arithmetic operation ○ of a modular multiplication operation A○B=A*B mod N is introduced, and the F satisfies F(K, A)=A^K mod N (A^K denotes the K-th power of A).

4. The method according to claim 1, wherein the information processing apparatus is installed on an IC card, a cellular phone, or a PDA.

5. The method according to claim 3, wherein the integer K is split in a form of $K[j]=u*((2^t)^j)$ ($0 \leq u \leq (2^t)-1$, $t=1, 2, \ldots$).

6. The method according to claim 5, whereby the permutation processing, the permutation T is performed based on an information source prevents predicting any post-permutation data from pre-permutation data, or the permutation T is performed based on a dummy random number, and whereby the permutation processing is performed each time the expression 1 is performed.

7. The method according to claim 5, wherein the integer K is split in a form of $K[j]=u*((2^t)^j)$ ($0 \leq u \leq (2^t)-1$, $t=1, 2, \ldots$).

8. The method according to claim 1, wherein the S is a Mordell-Weil group on an elliptic curve E defined on a finite field GF(p) (p is a prime number) or $GF(2^n)$ (n is an integer equal to or greater than 1), and an expression F(K,A)=KA is satisfied, wherein the A denotes a point on the elliptic curve E, the KA denotes the arithmetic operation $\bigcirc$ performed on K number of As such that the KA denotes $A \bigcirc A \bigcirc A \ldots \bigcirc A$ (K number) when the K is positive, or $(-A) \bigcirc (-A) \bigcirc (-A) \ldots \bigcirc (-A)$ (|K|number) when the K is negative, and 0 (the point at infinity) on the E when the K is 0, the $\bigcirc$ denotes an addition operation in the Mordell-Weil group, and the $-A$ is an inverse in the Mordell-Weil group of the A.

9. The method according to claim 8, wherein the information processing apparatus is installed on an IC card.

10. The method according to claim 8, wherein the integer K is split in a form of $K[j]=u*((2^t)^j)$ ($0 \leq u \leq (2^t)-1$, $t=1, 2, \ldots$).

11. The method according to claim 10, wherein the information processing apparatus is installed on an IC card.

12. A method for calculating a value F(K, A) of a function F satisfying $F(K1+K2, A)=F(K1, A) \bigcirc F(K2, A)$ for two integers K1 and K2 in an encryption or decryption process of a cryptosystem by means of an information processing device which comprises a processing unit and a memory device, wherein $\bigcirc$ denotes an arithmetic operation in a commutative semigroup S, K designates an integer, and A designates an element of S, the method comprising:

decomposing the value K in the processing unit to m integers $K[0], K[1], \ldots, K[m-1]$ each of which is a value of a n-bit unit of a binary representation of the value K, wherein the binary representation of the value K is w bit, m*n equals w; and calculating $F(K[T(0)]*(2^n)^{(m-1T[0])}, A) \bigcirc F(K[T(1)]*(2^n)^{(m-1-T[1])}, A) \bigcirc, \ldots F(K[T(m-1)]*(2^n)^{(m-1-T[m-1])}, A)$ in the processing unit in an order of $F(K[T(0)]*(2^n)^{(m-1-T[0])}, A), F(K[T(1)]*(2^n)^{(m-1-T[1])}, A), \ldots F(K[T(m-1)*(2^n)^{(m-1T[m-1])}, A)$ defined by a string of integers $T(0), T(1), \ldots T(m-1)$ which is a random permutation of a string of integers $0, 1, \ldots m-1$.

13. The method according to claim 12, the permutation being performed based on a dummy random number each time the $F(K[T(0)]*(2^n)^{(m-1-T[0])}, A) \bigcirc F(K[T(1)]*(2^n)^{(m-1-T[1])}, A) \bigcirc, \ldots F(K[T(m-1)]*(2^n)^{(m-1-T[m-1])}, A)$ is calculated.

14. The method according to claim 12, wherein the commutative semigroup S is a Mordell-Weil group on an elliptic curve E defined on a finite field GF(p) or $GF(2^n)$, wherein p is a prime number, n is an integer equal to or greater than 1, and an expression F(K,A)=KA is satisfied, and wherein the value A denotes a point on the elliptic curve E, the value KA denotes the arithmetic operation $\bigcirc$ performed on K number of As such that the value KA denotes $A \bigcirc A \bigcirc A \ldots \bigcirc A$ when the value K is positive, or $(-A) \bigcirc (-A) \bigcirc (-A) \ldots \bigcirc (-A)$ when the value K is negative, or 0 on the elliptic curve E when the value K is 0, the symbol $\bigcirc$ denotes an addition operation in the Mordell-Weil group, and the value $(-A)$ is an inverse in the Mordell-Weil group of the value A.

15. The method according to claim 12, wherein the information processing device is an IC card.

16. An information processing device for calculating a value F(K,A) of a function F satisfying $F(K1+K2, A)=F(K1, A) \bigcirc F(K2, A)$ for two integers K1 and K2 in an encryption or decryption process of a cryptosystem, wherein $\bigcirc$ denotes an arithmetic operation in a commutative semigroup S, K designates an integer, and A designates an element of S, the information processing device comprising:

a processing unit; and a memory device, wherein the processing unit is adapted to decompose the value K to m integers $K[0], K[1], \ldots, K[m-1]$, each of which is a value of a n-bit unit of a binary representation of the value K, wherein the binary representation of the value K is w bit, m*n equals w, and the processing unit is further adapted to calculate $F(K[T(0)]*(2^n)^{(m-1-T[0])}, A) \bigcirc F(K[T(1)]*(2^n)^{(m-1-T[1])}, A) \bigcirc, \ldots F(K[T(m-1)]*(2^n)^{(m-1-T[m-1])}, A)$ in an order of $F(K[T(0)])*(2^n)^{(m-1-T[0])}, A), F(K[T(1)]1*(2^n)^{(m-1-T)[1]}, A), \ldots F(K[T(m-1)]*(2^n)^{(m-1-T[m-1])}, A)$ defined by a string of integers $T(0), T(1), \ldots T(m-1)$ which is a random permutation of a string of integers $0, 1, \ldots m-1$.

17. The information processing device according to claim 16, wherein the processing unit is adapted to perform the to permutation based on a dummy random number each time the $F(K[T(0)]*(2^n)^{(m-1T[0])}, A) \bigcirc F(K[T(1)]*(2^n)^{(m-1-T[1])}, A) \bigcirc, \ldots F(K[T(m-1)]*(2^n)^{(m-1-T[m-1])}, A)$ is calculated.

18. The information processing device according to claim 16, wherein the commutative semigroup S is a Mordell-Weil group on an elliptic curve E defined on a finite field GF(p) or $GF(2^n)$, wherein p is a prime number and n is an integer equal to or greater than 1, and an expression F(K,A)=KA is satisfied, and p1 wherein the value A denotes a point on the elliptic curve E, the value KA denotes the arithmetic operation $\bigcirc$ performed on K number of As such that the value KA denotes $A \bigcirc A \bigcirc A \ldots \bigcirc A$ when the value K is positive, or $(-A) \bigcirc (-A) \bigcirc (-A) \ldots \bigcirc (-A)$ when the value K is negative, or 0 on the elliptic curve E when the value K is 0, the symbol $\bigcirc$ denotes an addition operation in the Mordell-Weil group, and the value $(-A)$ is an inverse in the Mordell-Weil 25 group of the value A.

19. The information processing device according to claim 16, wherein the information processing device is an IC card.

* * * * *